(12) United States Patent
Furukawa et al.

(10) Patent No.: US 7,427,130 B2
(45) Date of Patent: Sep. 23, 2008

(54) IMAGE FORMING PROCESS AND IMAGE FORMING APPARATUS AND INK SET THEREFOR

(75) Inventors: Juichi Furukawa, Atsugi (JP); Hiroshi Adachi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 363 days.

(21) Appl. No.: 11/229,873

(22) Filed: Sep. 20, 2005

(65) Prior Publication Data

US 2006/0061643 A1 Mar. 23, 2006

Related U.S. Application Data

(63) Continuation of application No. PCT/JP2004/003782, filed on Mar. 19, 2004.

(30) Foreign Application Priority Data

Mar. 20, 2003 (JP) ............................. 2003-078577
Feb. 18, 2004 (JP) ............................. 2004-041222

(51) Int. Cl.
*C09D 11/00* (2006.01)
(52) U.S. Cl. ................. 347/100; 106/31.13; 106/31.27; 106/31.6; 347/95; 347/96
(58) Field of Classification Search ................. 347/100, 347/95, 96; 106/31, 31.13, 31.27, 31.6
See application file for complete search history.

(56) References Cited

U.S. PATENT DOCUMENTS 6,517,199 B1  2/2003  Tomioka et al.
6,536,890 B1  3/2003  Kato et al.
2002/0062762 A1  5/2002  Tomioka et al.
2003/0069329 A1  4/2003  Kubota et al.
2003/0070581 A1  4/2003  Tomioka et al.

FOREIGN PATENT DOCUMENTS

EP   1099731   5/2001
EP   1099733   5/2001
EP   1106658   6/2001

(Continued)

*Primary Examiner*—Manish S. Shah
*Assistant Examiner*—Laura E Martin
(74) *Attorney, Agent, or Firm*—Oblon, Spivak, McClelland, Maier & Neustadt, P.C.

(57) ABSTRACT

An image is formed by applying a recording composition having a colorant and a treating composition including a component that reacts with colorant droplets so that the compositions contact and mix with each other on a recording medium; and adjusting the pH of the mixture so that the treating composition and the recording composition react to form aggregates while any unreacted component forms aggregates as a simple substance, wherein the component that reacts with the colorant has an isoelectric point at which the zeta potential ($\zeta$) is 0 when zeta potential ($\zeta$) change of the component is plotted versus corresponding changes in the pH of the mixture, and wherein the recording composition and treating composition are respectively adjusted to satisfy $a<\gamma$ and $a<c$, wherein "c" is a pH value of the isoelectric point, "a" is a pH value of the mixture where the zeta potential ($\zeta$) change according to pH is on the more acidic side than the pH (c) of the isoelectric point, and is about $-2.5$ mV·l/mol, and "$\gamma$" is the pH of the mixture.

40 Claims, 6 Drawing Sheets

FOREIGN PATENT DOCUMENTS

| | | |
|---|---|---|
| EP | 1125760 | 8/2001 |
| EP | 1197533 | 4/2002 |
| EP | 1256459 | 11/2002 |
| JP | 4-259590 | 9/1992 |
| JP | 06-092010 | 4/1994 |
| JP | 11-228890 | 8/1999 |
| JP | 2000-034432 | 2/2000 |
| JP | 2001-171095 | 6/2001 |
| JP | 2001-199149 | 7/2001 |
| JP | 2001-199150 | 7/2001 |
| JP | 2001-199151 | 7/2001 |
| JP | 2002-201385 | 7/2002 |
| JP | 2002-205457 | 7/2002 |
| JP | 2002-225414 | 8/2002 |
| JP | 2003-43867 | 2/2003 |
| WO | WO 00/06390 | 2/2000 |

IMAGE FORMING PROCESS AND IMAGE FORMING APPARATUS AND INK SET THEREFOR

CROSS-REFERENCE TO RELATED APPLICATIONS

This is a continuation of Application No. PCT/JP2004/003782, filed on Mar. 19, 2004.

BACKGROUND OF THE INVENTION

1. Field of the Invention

The present invention relates to a printing technology in an ink-jet printer, and more particularly, an ink set comprising a recording composition and a treating composition with feathering and color bleed inhibited for high image quality, an image forming process and an image forming apparatus using the same, and a print.

2. Description of the Related Art

The ink-jet recording process, wherein an image is recorded using droplets of a recording composition containing a colorant, is advantageous in its simple printing mechanism without noise.

The image recording process has a problem in that character blurring (hereinafter referred to as feathering) may occur in accordance with a combination with a recording medium, which causes deterioration in image quality. In order to solve this problem, there has been an attempt to reduce the feathering by inhibiting the permeation of an ink (recording composition). However, this process has defects in that the hand is stained or image defects occur when the print is touched by the hand after printing since the recording composition has poor dryness.

Also, when a color image is printed, since inks of different colors are overlapped one upon another, the color inks are mixed or blurred in the boundary between the colors (hereinafter referred as color bleed), thereby deteriorating image quality. There has an attempt to reduce the color bleed by increasing the permeation of the recording composition. However, this process has defects in that the colorant gets into the recording medium, thereby causing reduction in image density, or a large amount of the recording composition passes through the back of the recording medium, which badly affects two-sided printing (printing on both sides of a sheet).

For these circumstances, there is demand for development of an image forming process to solve the foregoing problems and increase image quality.

For the above problems, it has been proposed a process using a recording composition containing a colorant in combination with a treating composition containing a component which can react with the colorant to form aggregates in a single body. For example, there is known a process using a recording composition in combination with a treating composition containing a water-soluble resin having at least one of carboxyl group or anhydride thereof, or sulfonate group. Also, a process using a recording composition in combination with a color free or light color liquid containing a compound at least two cationic groups in a molecule or a process using a recording composition in combination with a liquid composition comprising polyallylamine and glycerine is disclosed.

However, according to these processes, since such a high molecular reactive component is contained in the state dissolved in the treating composition, when it is added in a large amount, viscosity increase may occur, causing ejection failure from a recording head. Therefore, the content of the reactive component should be lowered and consequently, the viscosity change (increase) upon reaction with a colorant is reduced, whereby feathering inhibition effect is insignificant.

Also, there are proposed a process using a recording composition in combination with a color free or light colored liquid containing a polyhydric metal salt, a process using a recording composition in combination with a color free or light colored liquid containing a quaternary ammonium salt or amine salt, and a process using a recording composition in combination with a color free or light colored liquid containing a quaternary ammonium salt or amine salt and polyhydric alcohol.

However, in the process using a polyhydric metal salt or amine compound, these compounds may be added in a large amount but the size of the added molecule is small and hardly forms big aggregates even when reacted with the colorant. Therefore, the viscosity change upon reaction with a colorant is large enough, whereby feathering inhibition effect is insignificant.

In order to further improve image quality, a process using a treating composition containing fine particles as a component reactive with a colorant contained in a recording composition is proposed. For example, an ink-jet recording process is disclosed, wherein a color free liquid containing silica fine particles is adsorbed on a recording medium and a non-aqueous recording composition containing oil black (for example, Japanese Patent Application Laid-Open (JP-A) No. 4-259590). Also, a reaction solution containing an emulsion of a cation having a part of ability of UV absorption and/or light stabilization (for example, WO 2000-06390), or a solution containing fine particles, or fine particles and a binder polymer (for example, JP-A No. 6-92010) is disclosed. Further, a substantially color free liquid composition containing an anionic metal oxide colloid (for example, JP-A No. 11-228890), a light colored or white liquid composition comprising water-insoluble fine particles, a water-soluble organic solvent and water (for example, JP-A No. 2000-34432), a translucent white ink composition mainly comprising an inorganic oxide pigment (for example, JP-A No. 2001-171095), and a liquid composition comprising fine particles reactive with a colorant (for example, JP-A No. 2001-199149) are disclosed. In addition, a liquid composition comprising fine particles, which are surface-charged with a polarity opposite to that of a recording composition, in the state of a dispersion (for example, JP-A No. 2001-199150 and JP-A No. 2001-199151) is disclosed.

Since the liquid containing fine particles comprises the reactive fine particles in the state of a dispersion, it may inhibit increase in the viscosity and contain a large amount of the reactive component, as compared to the treating composition for dissolving a polymer as described above. Also, since the fine particles have a big particle size, as compared to the polyhydric metal salt and the like, when the dispersion is break by the reaction with a colorant, they may form big aggregates. As a result, the viscosity increases, migration of the colorant is inhibited and the feathering is improved. However, as the requirements for high image quality are strict, there is still demand for improvement of these processes.

Meanwhile, in order to produce a print with good image quality by using a recording composition in combination with a treating composition containing a component to aggregate a colorant in the recording composition, it should be necessary to make the adsorbed amount of the treating composition greater than the adsorbed amount of the recording composition. When using the treating composition, the liquid amount applied on the paper is increased by the liquid amount of the treating composition, as compared to the printing using only the recording composition. Therefore, the printed paper may swollen or cockled, or the feathering and color bleed are worsened since a large amount of liquids is applied on the paper at once.

For example, according to the JP-A No. 2001-199150, it is preferable that the mixture formed by mixing the recording composition containing a colorant and the treating composition containing fine particles in a weight ratio of about 1:1 has a pH where at least the colorant aggregates. However, when the two liquids are mixed in a weight ratio of about 1:1, the amount of the adsorbed liquid is 200% of the adsorbed amount of the recording composition along. Further, when the recording composition is applied to attain a sufficient concentration, the adsorbed amount increases, which may cause color bleed, feathering, and paper cockling.

Also, the JP-A No. 2001-199150 describes that it is preferable that the mixture formed by mixing the recording composition containing a colorant and the treating composition containing fine particles in a weight ratio of about 1:1 has a pH where at least the colorant aggregates. However, it does not include a description considering the isoelectric point of the component reactive with the colorant and the un-reacted component reactive with the colorant.

As described above, when the colorant contained in the recording composition and the component contained in the treating composition have a polarity opposite to each other, upon mixing of the recording composition with the treating composition, the colorant is adsorbed to the component reactive with the colorant to form aggregates. However, at this point, not all the colorant and the component reactive with the colorant react.

For example, about ⅓ of the mixed colorant and the fine particles contained in the treating composition aggregate by the reaction and the remaining ⅔ of the colorant permeates into the paper without reaction and is fixed. However, when it is applied on a paper with low permeation rate, the ink may be flow out into the adjacent image area, causing bleed (for example, JP-A No. 2002-201385).

According to the JP-A No. 2002-201385, the foregoing problems can be solved by adding a cationic compound to the treating composition so that it rakes the colorant molecule upon mixing, thereby restricting the location, whereby high color development, bleed inhibition and water resistance can be improved.

However, cationic polymers or oligomers which are mentioned as an example of the cationic compound, when added to the treating composition, may cause deterioration of storage stability of the treating composition and viscosity increase. A cationic surfactant lacks power to fix the colorant, as compared to the cationic polymers or oligomers and thereby, shows low and insufficient improving effect of high color development, bleed inhibition and water resistance of a print. Therefore, there is still great demand for storage stability of the treating composition and sufficiently high image quality of a print.

SUMMARY OF THE INVENTION

In order to solve the above-described problems, the present invention aims at realizing a printing technology which can satisfy both sufficient storage stability of a treating composition and recording composition constituting an ink set and high quality image of prints. Thus, it is an object of the present invention to provide an ink set comprising a treating composition and recording composition which is capable of forming a high quality ink-jet record showing extensive color regeneration, excellent color uniformity, particularly without solid spots, clearness of printed characters without blotting, excellent feathering properties, good color bleed without blotting at the interface between colors, high image density, and good scrape resistance and water resistance, on a plain paper, an image forming process, an image forming apparatus, and a print.

According to the present invention, in order to solve the foregoing subjects, attention was paid to the problems, which are involved in the prior art of an un-reacted colorant contained in a recording composition and an un-reacted component which is supposed to react with a colorant contained in a treating composition during image forming, particularly the fact that about ⅔ of the component supposed to react with a colorant remains un-reacted.

From this point of view, the present inventors made a close study of the foregoing subjects and found that the problems involved in the prior arts can be prevented by a process for forming an image comprising applying a recording composition containing a colorant and a treating composition containing a component reactive with the colorant as droplets so that they contact and mix to react with each other on a recording medium and adjusting pH of the mixture, wherein the component reactive with the colorant has an isoelectric point at which zeta potential is zero when zeta potential ($\zeta$) change according to the pH is plotted, whereby the un-reacted component reactive with the colorant aggregates as a simple substance, and more preferably, the colorant has a pH range where the colorant aggregates as a simple substance, and accordingly has a so-called initial aggregation point, whereby the un-reacted colorant aggregate as a simple substance. The present invention has been completed based on the above-described discoveries.

In this connection, the problems involved in the prior arts include bleed or feathering, caused by outflow of the colorant contained in the recording composition and the component reactive with the colorant contained in treating composition in the un-reacted state to a recording medium.

Now, the present invention will be explained in detail.

The invention according to Aspect 1 is a process for forming an image comprising applying a recording composition containing a colorant and a treating composition containing a component reactive with the colorant as droplets so that the compositions contact and mix with each other on a recording medium and adjusting pH of the mixture so that the treating composition and the recording composition react to aggregate while the un-reacted component reactive with the colorant aggregates as a simple substance, wherein the component reactive with the colorant has an isoelectric point at which the zeta potential ($\zeta$) is 0 when the zeta potential ($\zeta$) change of the component is plotted according to the pH change of the mixture, and the recording composition and treating composition are respectively adjusted to satisfy a<γ, a<c, wherein "c" is a pH value of the isoelectric point, "a" is a pH value, where the zeta potential ($\zeta$) change according to pH in the more acidic side than the pH (c) of the isoelectric point is about −2.5 mV·l/mol, and "γ" is the pH of the mixture, in the following differential equation (2) obtained from the relation derived from the plotting:

$$\zeta'=F'(\sigma)=B \cdot S'(\sigma)+C2 \qquad (2)$$

wherein, a variable "σ" is pH, and "B" and "C2" are integers.

The invention according to Aspect 2 is a process for forming an image comprising applying a recording composition containing a colorant and a treating composition containing a component reactive with the colorant as droplets so that the compositions contact and mix with each other on a recording medium and adjusting pH of the mixture so that the treating composition and the recording composition react to aggregate while the un-reacted component reactive with the colorant aggregate as a simple substance, wherein the component reactive with the colorant has an isoelectric point at which the zeta potential ($\zeta$) is 0 when the zeta potential ($\zeta$) change of the component is plotted according to the pH change of the mixture, wherein when the component reactive with the colorant has a pH where the component reactive with the colorant is eluted, and the recording composition and treating composition were respectively adjusted to satisfy a<$\gamma$<e, a<c, wherein "c" is a pH value of the isoelectric point, "a" is a pH, where the zeta potential ($\zeta$) change according to pH in the more acidic side than the pH (c) of the isoelectric point is about −2.5 mV·l/mol, "$\gamma$" is the pH of the mixture, and e is a pH where the component reactive with the colorant is eluted, in the following differential equation (2) obtained from the relation derived from the plotting:

$$\zeta' = F'(\sigma) = B \cdot S'(\sigma) + C2 \quad (2)$$

wherein, a variable "$\sigma$" is pH, and "B" and "C2" are integers.

The invention according to Aspect 3 is a process for forming an image comprising applying a recording composition containing a colorant and a treating composition containing a component reactive with the colorant as droplets so that the compositions contact and mix with each other on a recording medium and adjusting pH of the mixture so that the treating composition and the recording composition react to aggregate while the un-reacted component reactive with the colorant aggregate as a simple substance, wherein the component reactive with the colorant has an isoelectric point at which the zeta potential ($\zeta$) is 0 when the zeta potential ($\zeta$) change of the component is plotted according to the pH change of the mixture, and the recording composition and treating composition are respectively adjusted to satisfy a<$\gamma$, a<c, c−2<$\gamma$<c+2, wherein "c" is a pH value of the isoelectric point, "a" is a pH value, where the zeta potential ($\zeta$) change according to pH in the more acidic side than the pH (c) of the isoelectric point is about −2.5 mV·l/mol, and "$\gamma$" is the pH of the mixture, in the following differential equation (2) obtained from the relation derived from the plotting:

$$\zeta' = F'(\sigma) = B \cdot S'(\sigma) + C2 \quad (2)$$

wherein, a variable "$\sigma$" is pH, and "B" and "C2" are integers.

The invention according to Aspect 4 is a process for forming an image comprising applying a recording composition containing a colorant and a treating composition containing a component reactive with the colorant as droplets so that the compositions contact and mix with each other on a recording medium and adjusting pH of the mixture so that the treating composition and the recording composition react to aggregate while the un-reacted component reactive with the colorant aggregates as a simple substance, wherein the component reactive with the colorant has an isoelectric point at which the zeta potential ($\zeta$) is 0 when the zeta potential ($\zeta$) change of the component is plotted according to the pH change of the mixture, and the recording composition and treating composition are respectively adjusted to satisfy a<$\gamma$, a<c, c−1.5<$\gamma$<c+1.5, wherein "c" is a pH value of the isoelectric point, "a" is a pH value, where the zeta potential ($\zeta$) change according to pH in the more acidic side than the pH (c) of the isoelectric point is about −2.5 mV·l/mol, and "$\gamma$" is the pH of the mixture, in the following differential equation (2) obtained from the relation derived from the plotting:

$$\zeta' = F'(\sigma) = B \cdot S'(\sigma) + C2 \quad (2)$$

wherein, a variable "$\sigma$" is pH, and "B" and "C2" are integers.

The invention according to Aspect 5 is a process for forming an image comprising applying a recording composition containing a colorant and a treating composition containing a component reactive with the colorant as droplets so that the compositions contact and mix with each other on a recording medium and adjusting pH of the mixture so that the treating composition and the recording composition react to aggregate while the un-reacted component reactive with the colorant aggregate as a simple substance, wherein the component reactive with the colorant has an isoelectric point at which the zeta potential ($\zeta$) is 0 when the zeta potential ($\zeta$) change of the component is plotted according to the pH change of the mixture, wherein the component reactive with the colorant comprises cationic colloidal silica fine particles, and the recording composition and treating composition are respectively adjusted to satisfy a<$\gamma$, a<c, $\zeta$<60 mV, wherein "c" is a pH value of the isoelectric point, "a" is a pH value, where the zeta potential ($\zeta$) change according to pH in the more acidic side than the pH (c) of the isoelectric point is about −2.5 mV·l/mol, and "$\gamma$" is the pH of the mixture, in the following differential equation (2) obtained from the relation derived from the plotting:

$$\zeta' = F'(\sigma) = B \cdot S'(\sigma) + C2 \quad (2)$$

wherein, a variable "$\sigma$" is pH, and "B" and "C2" are integers.

The invention according to Aspect 6 is a process described in any one of Aspects 1 to 5, characterized in that the colorant has a pH range where the colorant alone aggregates and an initial aggregation point in the boundary of the pH range, and the pH of the mixture is adjusted to satisfy the pH conditions in the range including the initial aggregation point of the colorant, at least where the colorant alone aggregate, to form an image.

The invention according to Aspect 7 is the process for forming an image described in any one according to Aspects 1 to 6, characterized in that the pH ($\gamma$) of the mixture satisfies 5.5<$\gamma$<10.5.

The invention according to Aspect 8 is the process for forming an image described in any one according to Aspects 1 to 6, characterized in that the pH ($\gamma$) of the mixture satisfies 6<$\gamma$<10.

The invention according to Aspect 9 is the process for forming an image described in any one according to Aspects 1 to 6, characterized in that the pH ($\gamma$) of the mixture satisfies 6.5<$\gamma$<9.5.

The invention according to Aspect 10 is the process for forming an image described in any one of Aspects 1 to 9, characterized in that the ratio (Mj1/Mj2: $\alpha$) of an attached amount (Mj1) of the treating composition to an attached amount (Mj2) of the recording composition on the recording medium is 0.1 to 0.9.

The invention according to Aspect 11 is the process for forming an image described in any one of Aspects 1 to 9, characterized in that the sum (Mj1+Mj2: $\beta$) of an attached amount (Mj1) of the treating composition and an attached amount (Mj2) of the recording composition on the recording medium is 0.78<$\beta$<20 (g/m$^2$).

The invention according to Aspect 12 is the process for forming an image described in any one of Aspects 1 to 11, characterized in that the average particle diameter (f) of the component reactive with the colorant in the treating composition and the average particle diameter (g) of the component reactive with the colorant as a simple-substance aggregate at the pH ($\gamma$) of the mixture satisfy g/f>2.

The invention according to Aspect 13 is the process for forming an image described in any one of Aspects 1 to 12, characterized in that the mixture is a buffer solution.

The invention according to Aspect 14 is the process for forming an image described in Aspect 12, characterized in that the buffer solution comprises at least two types of an "A" component and a "B" component which are separately contained in the treating composition and the recording composition, wherein the "A"0 component and the "B" component shows buffering effect only when they are mixed and reacted in the same liquid.

The invention according to Aspect 15 is the process for forming an image described in Aspect 14, characterized in that the "A" component is cationic or non-ionic.

The invention according to Aspect 16 is the process for forming an image described in Aspect 14, characterized in that the "A" component is a weak acid.

The invention according to Aspect 17 is the process for forming an image described in Aspect 14, characterized in that the "A" component is a salt of a weak base.

The invention according to Aspect 18 is the process for forming an image described in Aspect 14, characterized in that the "B" component is anionic or non-ionic.

The invention according to Aspect 19 is the process for forming an image described in Aspect 14, characterized in that the "B" component is a weak base.

The invention according to Aspect 20 is the process for forming an image described in Aspect 14, characterized in that the "B" component is a salt of a weak acid.

The invention according to Aspect 21 is the process for forming an image described in any one of Aspects 1 to 20, characterized in that the component reactive with a colorant comprises fine particles.

The invention according to Aspect 22 is the process for forming an image described in Aspect 21, characterized in that the fine particles comprise a metal oxide.

The invention according to Aspect 23 is the process for forming an image described in Aspect 1, characterized in that the colorant is a pigment.

The invention according to Aspect 24 is the process for forming an image described in any one of Aspects 1 to 20, characterized in that the colorant is a dye.

The invention according to Aspect 25 is an image forming apparatus, comprising: a container housing at least one of a recording composition containing a colorant and a treating composition containing a component reactive with the colorant; composition applying means for applying the recording composition and the treating composition as droplets so that the compositions contact and mix with each other on a recording medium; and pH adjusting means for adjusting pH of the mixture so that the treating composition and the recording composition react to aggregate while the un-reacted component reactive with the colorant aggregates as a simple substance, wherein the component reactive with the colorant has an isoelectric point at which the zeta potential ($\zeta$) is 0 when the zeta potential ($\zeta$) change of the component is plotted according to the pH change of the mixture, and the recording composition and treating composition are respectively adjusted to satisfy a<γ, a<c, wherein "c" is a pH value of the isoelectric point, "a" is a pH value where the zeta potential ($\zeta$) change according to pH in the more acidic side than the pH (c) of the isoelectric point is about −2.5 mV·l/mol, and "γ" is the pH of the mixture, in the following differential equation (2) obtained from the relation derived from the plotting:

$$\zeta'=F'(\sigma)=B \cdot S'(\sigma)+C2 \qquad (2)$$

wherein, a variable "σ" is pH, and "B" and "C2" are integers.

The invention according to Aspect 26 is the image forming apparatus described in Aspect 25, characterized in that the composition applying means applies the recording composition and the treating composition, so that the ratio (Mj1/Mj2: α) of an attached amount (Mj1) of the treating composition to an attached amount (Mj2) of the recording composition on the recording medium is 0.1 to 0.9.

The invention according to Aspect 27 is the image forming apparatus described in Aspect 25, characterized in that the composition applying means applies the recording composition and the treating composition, so that the sum (Mj1+Mj2: β) of an attached amount (Mj1) of the treating composition and an attached amount (Mj2) of the recording composition on the recording medium is 0.78<β<20 (g/m²).

The invention according to Aspect 28 is an ink set, comprising: a recording composition containing a colorant; and a treating composition containing a component reactive with the colorant, wherein the component reactive with the colorant has an isoelectric point at which the zeta potential ($\zeta$) is 0 when the zeta potential ($\zeta$) change of the component is plotted according to the pH change of the mixture, and the recording composition and treating composition are respectively adjusted to satisfy a<γ, a<c, wherein "c" is a pH value of the isoelectric point, "a" is a pH value where the zeta potential ($\zeta$) change according to pH in the more acidic side than the pH (c) of the isoelectric point is about −2.5 mV·l/mol, and "γ" is the pH of the mixture, in the following differential equation (2) obtained from the relation derived from the plotting:

$$\zeta'=F'(\sigma)=B \cdot S'(\sigma)+C2 \qquad (2)$$

wherein, a variable "σ" is pH, and "B" and "C2" are integers, so that when the recording composition and the treating composition are applied as droplets so that the compositions contact and mix with each other on a recording medium, the pH of the mixture is adjusted to form an image on the recording medium.

The invention according to Aspect 29 is a cartridge, comprising:

a receiving part containing a recording composition containing a colorant and a treating composition containing a component reactive with the colorant separately from each other; and an ejecting means for ejecting the treating composition and recording composition separately from each other, wherein the component reactive with the colorant has an isoelectric point at which the zeta potential ($\zeta$) is 0 when the zeta potential ($\zeta$) change of the component is plotted according to the pH change of the mixture, and the recording composition and treating composition are respectively adjusted to satisfy a<γ, a<c, wherein "c" is a pH value of the isoelectric point, "a" is a pH value where the zeta potential ($\zeta$) change according to pH in the more acidic side than the pH (c) of the isoelectric point is about −2.5 mV·l/mol, and "γ" is the pH of the mixture, in the following differential equation (2) obtained from the relation derived from the plotting:

$$\zeta'=F'(\sigma)=B \cdot S'(\sigma)+C2 \qquad (2)$$

wherein, a variable "a" is pH, and "B" and "C2" are integers.

The invention according to Aspect 30 is a print, printed on a recording medium by a process for forming an image according to any one of Aspects 1 to 24.

According to the present invention, by using an ink set comprising a recording composition containing a colorant and a treating composition containing a component reactive with the colorant and an image forming process wherein the treating composition and the recording composition are reacted to aggregate and also, the un-reacted components aggregate as a simple substance, it is possible to obtain a print having excellent image properties such as high color development, high density, high color saturation, improved light resistance, water resistance and gas resistance, with colorant diffusion and bleeding being inhibited.

Also, by prescribing the mixture of the treating composition and recording composition to be a buffer solution, it is possible to set the mixture to a predetermined pH, even when the balance between the attached amounts of the treating composition and recording composition is somewhat upset and thus, to obtain a print satisfying low feathering, low color bleed, high image density, low show-through density, high scrape resistance, high color saturation, light resistance, water resistance, gas resistance and the like. Further, even when fine particles are used as a component, it is possible to obtain a print satisfying the above-described properties, because the mixture has a high viscosity. In addition, when cationic colloidal silica is used, it is possible to produce a print with highly improved image quality by setting a zeta potential to 60 mV or less.

The image forming processes according to the present invention are accomplished by an ink-jet type image forming apparatus loading a cartridge receiving the treating composition and the recording composition according to the present invention separately from each other and produce a print with higher image quality by virtue of the ink set of excellent properties.

By receiving the treating composition and recording composition separately in a cartridge, it is possible to simply and steadily carry out maintenance work, in addition to compact construction of an image forming apparatus.

DESCRIPTION OF THE PREFERRED EMBODIMENTS

Figure 1:
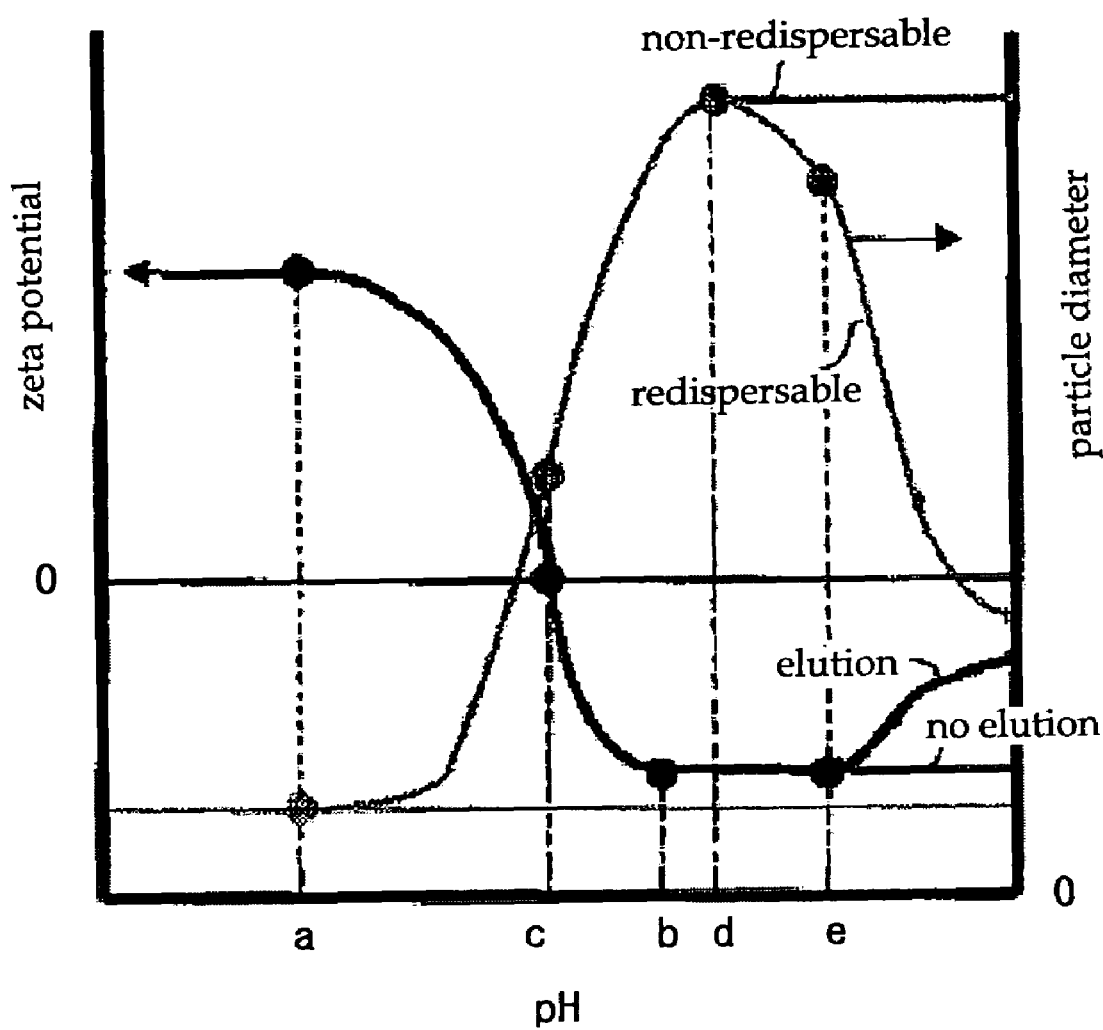
FIG. 1 is a schematic view for explaining the relation between fine particles having an isoelectric point which are contained in the treating composition according to the present invention and zeta potential.

Now, the effects of the inventions in respective Aspects are explained in further detail.

According to the construction of Aspect 1 or 2, the diffusion of the colorant and bleed are inhibited, whereby it is possible to obtain a print having excellent image properties such as high color development, high density, high color saturation, and improved light resistance, water resistance and gas resistance.

That is, when the component reactive with the colorant contained in the treating composition (for example, fine particles) has an isoelectric point, there are two specific points in the acid side and the base side from the pH of the mixture at the isoelectric point, each point being in each side, wherein the specific point at the far acidic side is a point (initial aggregation point) where $F'(a) = -2.5$ mV·l/mol and above this pH, the component with reactive with the colorant aggregates as a simple substance. Therefore, if the pH ($\gamma$) of the mixture is in the range (a<$\gamma$) satisfying the above pH, the colorant contained in the recording composition and the fine particles in the treating composition aggregates by adsorption and even un-reacted fine particles aggregate as a simple substance, thereby producing a print with excellent image properties, as described above. Also, the fine particles are a substance eluted at pH=e, $\gamma$ is preferably a<$\gamma$<e, as described above.

By Aspect 3 or 4, the aggregation of the component reactive with the colorant (for example, fine particle) as a simple substance can be promoted and the particle diameter of the aggregates can be increased. As a result, it is possible to obtain a print having color diffusion inhibited and bleed inhibition promoted along with excellent image properties such as high color saturation, high density, high color saturation, and improved light resistance, water resistance and gas resistance. Also, in the image forming process of Aspect 3 or 4, it is possible to combinedly perform the process described in Aspect 2, whereby the effects described in Aspect 2 are added.

According to the construction of Aspect 5, when the component reactive with the colorant contained in the treating composition is cationic colloidal silica, a part of cationic colloidal silica lose dispersion stability and aggregates as a simple substance at a zeta potential $\zeta$ of 60 mV or less.

Therefore, by setting the $\zeta$ potential in the recording composition and the treating composition to 60 mV or less, it is possible to produce a print with highly improved image quality. Also, since cationic colloidal silica shows high reactivity with the colorant in an inorganic fine particles, it is possible to provide high image quality. Further, in the image forming process of Aspect 5, it is possible to combinedly carry out the process described in Aspect 2, whereby the effects described in Aspect 2 are added.

According to the construction of Aspect 6, even when the colorant contained in the recording composition remains un-reacted, the colorant itself aggregates as a simple substance and the amount of the un-reacted colorant is reduced. As a result, aggregates increase more than when the colorant and the fine particles aggregate by adsorption and the component reactive with the colorant aggregates and the viscosity of the mixture increases. Accordingly, it is possible to improve high color development, bleed inhibition, light resistance, water resistance, gas resistance and the like.

According to the constructions of Aspects 7 to 9, since γ is a pH near the neutrality, an ink set comprising a treating composition and a recording composition which are not a strong acid or strong base, respectively can be used in an image forming apparatus and the liquid contact suitable for this image forming apparatus is suitably attained.

According to the construction of Aspect 10, it is possible to prevent shortage of image density by lack of the amount of the treating composition (sufficient printing is impossible), problems such as feathering, color bleed or cockling by over adsorption of the treating composition, thereby producing a record with high image quality.

According to the construction of Aspect 11, it is possible to prevent shortage of image density by lack of the total adsorbed amount (sufficient printing is impossible), problems such as feathering or color bleed by excessive adsorbed amount of the recording composition and the treating composition, thereby producing a record with high image quality.

According to the construction of Aspect 12, since at least the simple-substance aggregates of the component reactive with the colorant (for example, fine particles) in the treating composition have a particle diameter of two times more and the aggregates serve as a filler layer of the colorant contained in the recording composition, the image quality may be greatly improved. By using this treating composition, it is possible to obtain a print with low feathering, low color bleed, high image density, low show-through concentration, high scrape resistance, high color saturation, light resistance, water resistance and gas resistance.

According to Aspects 13 to 20, by adding necessary ingredients to the treating composition and the recording composition and rendering the mixture to be buffer solution, even when balance between the adsorbed amount of the treating composition and the adsorbed amount of the recording composition is somewhat upset, it is possible to adjust the pH to a desired (specific) value including the variation.

By a printing process using an ink set comprising a treating composition and a recording composition to be such buffer solution, it is possible to obtain a record with low feathering, low color bleed, high image density, low show-through concentration, high scrape resistance, high color saturation, light resistance, water resistance and gas resistance.

According to Aspects 21 to 22, by using fine particles as the component reactive with the colorant, preferably the fine particles aggregate to increase particle diameter, thereby effectively increasing the viscosity of the mixture. Further, when the fine particles are a metal oxide, since most of the metal oxides have an isoelectric point, they lose dispersion stability near the isoelectric point and aggregate as a simple substance, increasing the particle diameter of the fine particles and the viscosity. By using this treating composition, it is possible to obtain a print with low feathering, low color bleed, high image density, low show-through concentration, high scrape resistance, high color saturation, light resistance, water resistance and gas resistance.

According to the construction of Aspect 23, when the colorant is a pigment, the water resistance, light resistance and gas resistance of a print is improved, as compared to a dye and the image quality of the print seldom deteriorated. Also, in case of the recording composition containing a pigment having an initial aggregation point, a print may have a high image density since when the pH of the mixture is set in the pH range where colorant aggregate as a simple substance, aggregates with a large particle diameter are formed.

According to the construction of Aspect 24, when the colorant is a dye, it is possible to obtain a print with high color saturation. A print printed using a dye having an initial aggregation point may have a high image density since when the pH of the mixture is set in the pH range where colorant aggregate as a simple substance, aggregates with a large particle diameter are formed.

According to the image forming apparatus of Aspect 25, it is possible to obtain a print satisfying low feathering, low color bleed, high image density, low show-through concentration, high scrape resistance, high color saturation, light resistance, water resistance and gas resistance.

By using the ink set according to Aspect 28, it is possible to obtain a print having color diffusion inhibited, as described in Aspects 1 to 24, satisfying low feathering, low color bleed, high color saturation, high density, improved water resistance along with low show-through concentration, high scrape resistance, high color saturation, light resistance, water resistance and gas resistance.

According to the construction of Aspect 29, it is possible to readily load and exchange the recording composition and treating composition in an image forming apparatus without spillage and thereby, to simply and steadily carry out maintenance work and to realize the stabilization of image quality. Also, it is possible to compactly construct an image forming apparatus.

According to Aspect 30, it is possible to obtain a print having color diffusion diffused, satisfying low feathering, low color bleed, high color saturation, high density, improved water resistance along with low show-through concentration, high scrape resistance, high color saturation, light resistance, water resistance and gas resistance.

Now, the embodiment of the present invention will be explained.

As described above, the ink set according to the present invention comprises the recording composition a colorant and the treating composition which contains the component reactive with the colorant. Also, when the recording composition and the treating composition are brought into contact and are mixed with each other, the resulting mixture is adjusted to a specific pH.

The specific pH of the mixture is set by prescribing the recording composition and the treating composition so that it proximately agrees with or is near the pH at an isoelectric point where the zeta potential (ζ) of the component reactive with the colorant contained in the treating composition is zero. That is, the component reactive with the colorant "has an isoelectric point where the zeta potential (ζ) is zero by adjustment of pH" (hereinafter, expressed as the component reactive with the colorant "has an isoelectric point").

Also, near the specific pH, that is, the isoelectric point, the colorant in the recording composition is reacted with the component reactive with the colorant (component) in the treating composition to aggregate and even the un-reacted component aggregates alone (as a simple substance).

More preferably, the recording composition and the treating composition are prescribed so that the adjusted specific pH is in the pH range where the colorant contained in the recording composition aggregates as a simple substance. In other words, the colorant has a pH range where it pH-dependently aggregates as a simple substance and an initial aggregation point in the boundary of the pH range and the pH of the mixture is adjusted to be in the pH range, where at least the colorant aggregates as a simple substance, including the initial aggregation point. That is, "the colorant has an initial aggregation point at which it aggregates according to the pH change" (hereinafter expressed as, "the colorant has an initial aggregation point"). By adjusting like this, in the vicinity of a specific pH, that is, in the vicinity of the isoelectric point, the treating composition and the recording composition react to aggregate and also, the colorant and the component, though being un-reacted, aggregate separately as a simple substance. By using this ink set, the foregoing problems can be solved. Below, the present invention is described.

Firstly, the component reactive with the colorant in the recording composition contained in treating composition constituting the ink set according to the present invention has an isoelectric point and shows change in dispersion stability by adjusting of pH. Since the component reactive with the colorant has an isoelectric point, it loses self-dispersibility near the pH at the isoelectric point (or the pH near the isoelectric point), thereby aggregating as a simple substance. Therefore, by mixing the treating composition containing the component having an isoelectric point with the recording composition containing the colorant and adjusting the pH of the mixture to near the pH of the isoelectric point of the component, it is possible to form aggregates of the component and the colorant by adsorption and aggregates of the un-reacted component as a simple substance.

Therefore, the aggregates generated during mixing of the treating composition and the recording composition further comprise the aggregates of the component as a simple substance, in addition to the aggregates composed of the component and the colorant adsorbed thereto by the reaction and thus, the total aggregates increases. In other words, the viscosity of the mixture increases as compared to when the pH of the mixture is not adjusted and the component does not aggregate as a simple substance.

Thus, by adjusting the pH of the mixture when the colorant of the recording composition and the component reactive with the colorant of the treating composition which constitute the ink set are brought into contact and are mixed with each other so that the component aggregates as a simple substance, a print using the ink set shows inhibited color diffusion, high color development, high density, inhibited bleed and improved water resistance. Particularly, when the component is fine particles having an isoelectric point, a high viscosity can be obtained only by the aggregation of the treating composition.

In the present invention, when fine particles having an isoelectric point form micelles by adsorption of a surfactant, the micelles as a whole are considered as fine particles and the appearance isoelectric point of the micelles is considered as an isoelectric point.

As the colorant contained in the recording composition constituting the ink set according to the present invention, a colorant having an initial aggregation point, as described above, may be used. When the recording composition containing a colorant having an initial aggregation point and the treating composition containing the component reactive with the colorant are mixed, if the pH of the mixture is adjusted in the range, where the colorant aggregates as a simple substance, including the initial aggregation point of the colorant, as described above, the un-reacted colorant aggregate alone (as a simple substance). As a result, aggregates increases more than when the colorant and the fine particles aggregate by adsorption and the viscosity of the mixture increases. Also, the un-reacted amount of the colorant is reduced and thus, it is possible to improve high color development, bleed inhibition, light resistance, water resistance, gas resistance and the like.

The most preferred construction according to the present invention is the ink set comprising the recording composition containing the colorant having an initial aggregation point and the treating composition containing the component reactive with the colorant having an isoelectric point (component having an isoelectric point), wherein the pH of the mixture which is formed when the recording composition and the treating composition are brought into contact or are mixed with each other on a recording medium to form an image is adjusted in the range where the colorant and the component having an isoelectric point aggregate by adsorption, and the colorant and the component having an isoelectric point aggregate separately as a simple substance.

Though the ink set is provided based on the above-described principle in the present invention, the component reactive with the colorant (component) is focused on zeta potential ($\zeta$ potential), for example, of fine particles. The $\zeta$ potential is important as a parameter representing the dispersion state. By constructing the ink set considering the pH dependence of $\zeta$ potential of certain fine particles contained in the treating composition which are used as the component reactive with the colorant, it is possible to suitably control desired conditions for the ink set, for example, desired pH values, thereby accomplishing the present invention.

FIG. 1 shows the relation between the pH and the particle diameter and the zeta potential ($\zeta$ potential) of the fine particles having an isoelectric point. The relation between the pH change and the $\zeta$ potential is shown as a curve in FIG. 1. Also, using the curve shown in FIG. 1, $\zeta$ potential may be expressed by the following equation (1), wherein the $\zeta$ potential is $\zeta$ (mV·l/mol) and the pH is a variable $\sigma$.

$$\zeta = F(\sigma) = A \cdot S(\sigma) + C1 \tag{1}$$

(wherein, a variable $\sigma$ is pH, A and C1 are an integer.)

In the above equation (1), where the pH at the isoelectric point is c, F(c)=0. Also, the $\zeta$ potential change ($\zeta'$) (mV·l/mol) may be expressed by the following equation which is a differential equation of the above equation (1).

$$\zeta' = F'(\sigma) = B \cdot S'(\sigma) + C2 \tag{2}$$

(wherein, a variable $\sigma$ is pH, B and C2 are an integer.)

Also, where the pH of the mixture is $\gamma$, it is possible to produce a print with high quality by adjusting the pH ($\gamma$) so that F'($\gamma$) required by the above equation (2) satisfies at least F'($\gamma$)<−2.5 in the pH range less than the pH (c). Where the pH at F'(a)=−2.5 is a, the $\zeta$ potential change $\zeta'$ (mV·l/mol) dramatically increases from this pH value of a. This is believed that the pH is high where the zeta potential ($\zeta$ potential) change F'(a)=−2.5 and when F'($\gamma$)<−2.5, a part of the fine particles aggregate as a simple substance.

The pH value, where the zeta potential is a minimum value in the more basic side than the pH value at the isoelectric point, is b.

For example, if the component reactive with the colorant is cationic colloidal silica (fine particles), the fine particles start to aggregate from the pH at which the $\zeta$ potential is 60 mV or less.

In this case, pH or ejection rate of the treating composition and the recording composition is adjusted so that the $\zeta$ potential of the treating composition becomes 60 mV or less.

When the component reactive with the colorant (for example, fine particle) contained in the treating composition has an opposite polarity to the colorant contained in the recording composition, the aggregation effect is increased. When the fine particles contained in the treating composition are cationic and the colorant contained in the recording composition is anionic, the ink set is more effective. The ink set having such construction satisfies l<$\gamma$<m, wherein $\gamma$ is the pH of the mixture, l is the pH of the recording composition and m is the pH of the treating composition.

Where the pH at the isoelectric point is c, the pH at F'(a)=−2.5 is a and the pH at the minimum value of the ζ potential is b, when the pH of the treating composition is varied from the acid side to the base side, a is an initial aggregation point of the component (fine particles) contained in the treating composition and if the dispersion of the fine particle is reversible, there is observed a point where the particle size of the fine particles which aggregation at the pH value of d near b is the maximum. If the aggregation of the fine particles is irreversible, the change of the particle size of the fine particles is reduced at be or more. $\gamma$ is preferably e or less where the fine particles are eluted.

The aggregates in the mixture may be three types, wherein one is the aggregate of the colorant and the component reactive with the colorant (for example, fine particles) adsorbed thereto, another is the aggregate of the colorant as a simple substance and the rest is the aggregate of the fine particles as a simple substance. When the fine particles are reactive with the colorant, the aggregate of the colorant and the fine particles adsorbed thereto, among the three types of aggregates, must be formed. The mixture having all of the three types of the aggregates shows the highest viscosity increase. If only one of the aggregate of the colorant as a simple substance and the aggregate of the fine particles as a simple substance is formed in addition to the aggregate of the colorant and the fine particle adsorbed thereto, the aggregate of the fine particles as a simple substance shows more significant increase in the particle size of the aggregate than the aggregate of the colorant as a simple substance. Therefore, when the aggregate of the colorant and the fine particles adsorbed thereto and the aggregates of the fine particles as a simple substance are formed, the viscosity increase is high.

Figure 2:
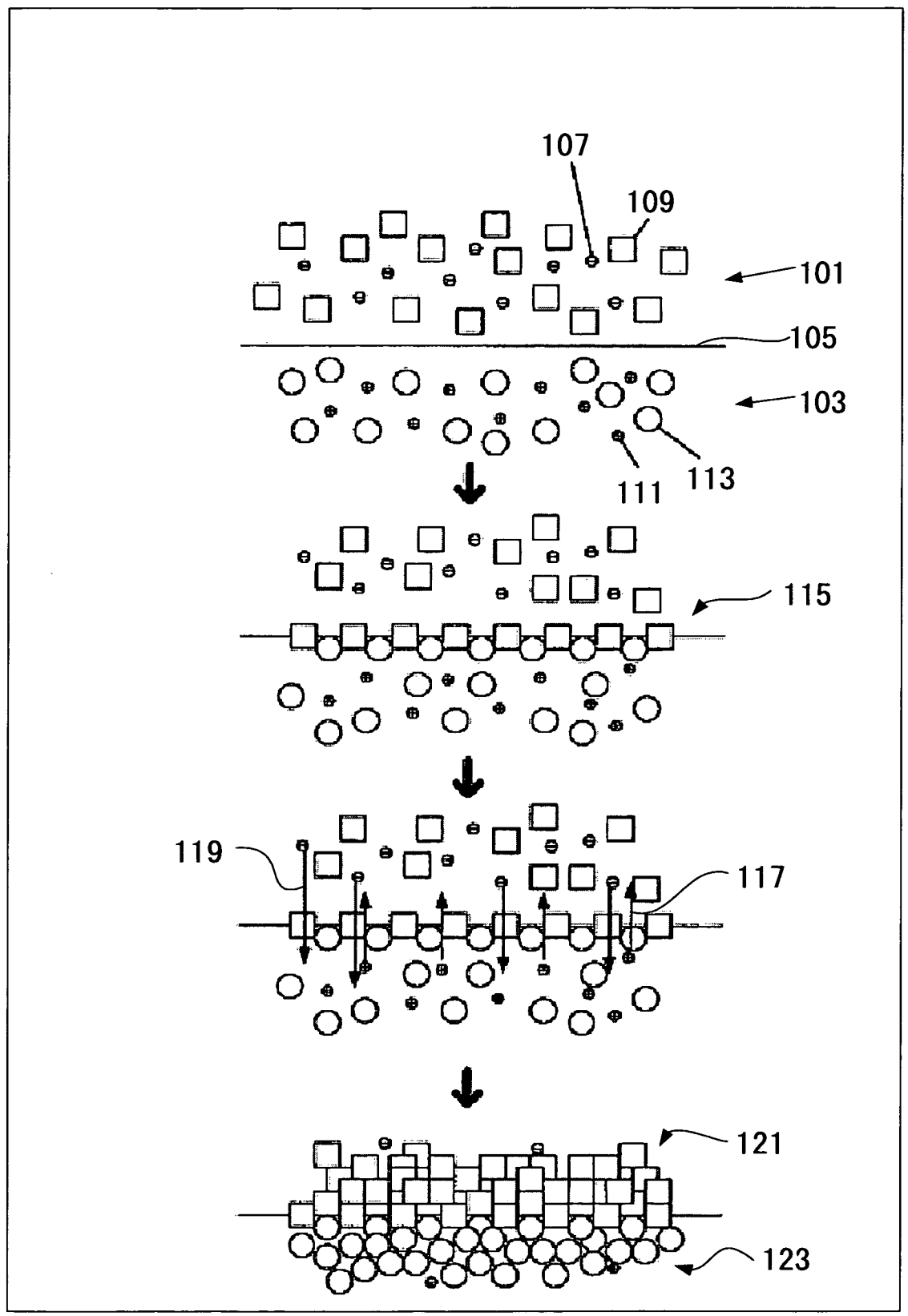
FIG. 2 is a schematic diagram for explaining the steps of image forming process according to the present invention by an example in which an acid is used as a pH adjusting agent for the treating composition and a base is used as a pH adjusting agent for the recording composition.

The steps of the image forming process according to the present invention is explained with reference to FIG. 2. The image forming process shows an embodiment using an acid as a pH adjusting agent for the treating composition and a base as a pH adjusting agent for the recording composition.

In the initial step, where the treating composition 103 and the recording composition 101 constituting the ink set according to the present invention are brought into contact, an aggregate layer 115 is formed near the contact interface 105 of the two liquids. When this layer 115 is formed, most of the colorant 109 and the fine particles 113 in the droplets have a big size and thus cannot migrate through this layer 115. However, the acid 111 in the treating composition 103 and the base 107 in the recording composition 101 can readily pass through the pores in the aggregate layer 115 owing to their small size, thereby being diffused. By the diffusion 117, 119 of these ions, the fine particles 113 and the colorant 109 are neutralized, whereby the surface potential is reduced. As a result, the dispersion state or dissolution state is collapsed and all the fine particles and colorants aggregate as a simple substance. Since this aggregation process is completed in a moment by the diffusion of the ions, in the image forming process according to the present invention, the aggregation of the whole system is completed before the colorant 109 flows. Thus, the colorant 109 aggregates without mixing with the fine particles 113 and there are formed an aggregate layer 121 of the colorant and an aggregate layer 123 of the fine particles.

When the fine particles have an isoelectric point, the particles completely lose their dispersibility at the isoelectric point where the zeta potential ζ is 0. Therefore, when the recording composition is mixed with the treating composition containing such fine particles, at a pH near the isoelectric point, the fine particles aggregate as a simple substance, thereby producing a print with high image properties.

For example, when the ink set combining the recording composition containing the colorant without an initial aggregation point and the treating composition containing fine particles with an isoelectric point is used, the fine particles are deteriorated at high pH, thereby not being eluted to the solution and where the pH at the isoelectric point is c, the pH where the zeta potential change, F'(a)=−2.5 in the acidic side from the isoelectric point is a, and the pH of the mixture is $\gamma$, the component (fine particles) aggregate alone at a pH of a or more. Therefore, the fine particles are deteriorated and are not eluted to the solution, the aggregation effect is high where a<$\gamma$, a<c. The pH where the ζ potential becomes the minimum is b.

The pH value $\gamma$ of the mixture is preferably $c-2<\gamma<c+2$, wherein the particle size of the aggregate of the particles as a simple substance increases, more preferably $c-1.5<\gamma<c+1.5$, wherein the particle size particularly increases.

Where the pH at which the fine particles are deteriorated and eluted to the solution is e, the particle diameter is reduced by the elution. Therefore, the particularly effective range is a<$\gamma$<e. More preferably, it is $c-2<\gamma<c+2<e$, wherein the particle diameter of the aggregate of the fine particles as a simple substance increases, more preferably $c-1.5<\gamma<c+1.5<e$, wherein the particle diameter of the aggregate of the fine particles as a simple substance.

The ink set comprising an anionic colorant contained in the recording composition has highly improved image quality and where the pH of the mixture is $\gamma$, the pH of the recording composition is l, and the pH of the treating composition is m, the three values satisfy $l<\gamma<m$.

Here, considering the liquid contact of the recording composition and the treating composition, it is preferable that l and m do not strong acid nor strong base and $\gamma$ is substantially neutral ($5.5<\gamma<10.5$). Therefore, the treating composition is preferably pH 5.5 or less, particularly no need to be a strong acid since $\gamma$ is preferably adjusted to satisfy $5.5<\gamma<10.5$, near neutrality. The recording composition is preferably pH 10.5 or more, particularly no need to be strong base. Since it is possible to use the ink set comprising the treating composition and the recording composition which are not strong acid nor strong base in the image forming apparatus, the liquid contact of the image forming apparatus is suitably attained.

Further, $\gamma$ preferably satisfies $6<\gamma<10$, more preferably $6.5<\gamma<9.5$ in each case, the treating composition is preferably pH 6 or less or pH 6.5 or less and there is no need for a stronger acid. Similarly, the recording composition is preferably pH 10 or more or 9.5 or more and there is no need for a stronger base. Thus, since it is possible to provide an ink set comprising the treating composition and the recording composition with the acidity or basicity weakened (not strong acid nor strong base) by closing $\gamma$ to the neutral pH, the liquid contact of the image forming apparatus is further improved.

Upon printing using the ink set satisfying the above conditions, the liquid amounts of the treating composition and the recording composition applied (ejected) on a recording medium are preferably adjusted so that the droplet amount of the treating composition (Mj1) and the droplet amount of the recording composition (Mj2) satisfy Mj1/Mj2=α and α<0.1-0.9. If α exceeds 0.9 (that is, the concentration is maintained higher enough), the total adsorbed mount increases, which may cause feathering, color bleed or cockling. If α is less than 0.1, the amount of the treating composition is reduced, the aggregate generated by the reaction of the treating composition and the recording composition cannot be formed sufficiently and thus, it is impossible to a desired image density.

The total droplet amount (Mj1+Mj2) of the droplet amount (Mj1) of the treating composition and the droplet amount (Mj2) of the recording composition applied (ejected) on the recording medium is preferably set to be 0.78<Mj1+Mj2<20 (g/m$^2$). If the total droplet amount (Mj1+Mj2) is less than 0.78 (g/m$^2$), the total adsorbed amount is insufficient and thus, it is impossible to attain a sufficient image density of a print. If Mj1+Mj2 exceeds 20 (g/m$^2$), a large amount of liquids is adsorbed and the ratio of the un-reacted recording composition or treating composition increases, which causes feathering and color bleed.

The pH$_\gamma$, at which the treating composition and the recording composition are mixed with each other can be adjusted by the following two processes.

(1) A process for adjusting the mixing ratio of the adsorbed amount of the treating composition (Mj1) and the adsorbed amount of the recording composition (Mj2).

(2) A process for making the mixture a buffer solution having a desired (specific) pH.

In the process (1), where the pH of the treating composition is l, the pH of the recording composition is m (provided that l<$_\gamma$<m), and Mj1/Mj2=$\alpha$, when a is a constant value, if Mj1 is increases, $_\gamma$ approaches to 1 while if Mj2 is increases, $_\gamma$ approaches to m. Based on this, the adsorbed amount of the treating composition (Mj1) and the adsorbed amount of the recording composition (Mj2) may be adjusted to set the pH. However, considering that the color saturation and density should be controlled by the adsorbed liquid amount and the microcontrol of the adsorbed liquid amount is difficult in an ink-jet recording apparatus, there is a problem that when a mixing is required in a delicate ratio near pH 7 the adjustment of $_\gamma$ is difficult.

In the process (2), by using a buffer solution controlled to have the pH of the mixing liquid, the mixture may have the pH set to obtain a somewhat high aggregation effect, regardless of the ratio of the adsorbed amounts of the treating composition or the recording composition. In other words, though it is difficult to simply attain optical conditions by microcontrolling the adsorbed amount of the recording composition (Mj2) with respect to the adsorbed amount of the treating composition (Mj1) and mixing a small amount of droplets to render the mixture to have a desired (specific) pH, it is possible to induce a desired (specific) pH by rendering the mixture to serve as a buffer solution even when the balance of the adsorbed amount of the treating composition and the adsorbed amount of the recording composition has some variations.

The buffering effect of the mixture is obtained when the A component contained in the treating composition and the B component contained in the recording composition exist in the same liquid and the A component and the B component should not interfere with dispersion stability in the treating composition and the recording composition.

For example, since the treating composition is preferably acidic (cationic), the A component should be cationic or non-ionic. Meanwhile, since the recording composition is preferably basic (anionic), the B component should be anionic or non-ionic. Also, the buffering effect is obtained when a combination of a weak acid and a salt of a weak acid or a salt of a weak base and a weak base is electrolyzed in the same solution. The weak acid and the salt of the weak base are cationic while the salt of the weak acid and the weak base are anionic.

Processes to make the mixture a buffer solution include using a buffer solution having strong buffering effect as the treating composition or the recording composition, or formulating the ingredients of the treating composition and the ingredients of the recording composition to show the buffering effect when they exist in the same solution.

As described above, in preparing the treating composition and the recording composition used in the ink set according to the present invention, a weak acid may be added to the treating composition while a salt of a weak acid may be added to the recording composition, or a salt of a weak base may be added to the treating composition while a weak base may be added to the recording composition. Such ink set becomes a buffer solution which can be set to a desired pH by a component contained therein, when the recording composition and the treating composition are mixed.

An example of the combination of the weak acid and the salt of the weak acid to form a buffer solution includes a combination of acetic acid and sodium acetate. An example of the combination of the weak base and the salt of the weak base to form a buffer solution includes a combination of ammonia and ammonium chloride. However, the present invention is not limited thereto.

In the printing process using the ink set combining a treating composition or recording composition comprising such component, it is possible to produce a print satisfying low feathering, low color bleed, high image density, low show-through concentration, high scrape resistance, high color saturation, light resistance, water resistance and gas resistance at the same time.

Now, the treating composition and the recording composition constituting the ink set according to the present invention will be explained in detail.

[Treating Composition]

The component reactive with a colorant contained in the treating composition is preferably an organic material such as an amphoteric monomer or an amphoteric polymer or an inorganic material such as a metal oxide, which have an isoelectric point. The inorganic material is largely classified into an inorganic salt such as calcium carbonate and an inorganic oxide such as silica.

Examples of the inorganic salts include, but are not limited to, calcium carbonate, calcium nitrate, calcium chloride, calcium sulfate, aluminum nitrate, aluminum chloride, aluminum sulfate and iron sulfate. In an aqueous treating composition, calcium carbonate, calcium nitrate, iron sulfate or other inorganic fine particles having a low solubility in water are preferably used for better dispersion. These colorants are preferably subjected to cationization for further higher adsorptivity and aggregation property. The modification by an ionic agent may be carried out by a known process, which includes, but is not limited thereto, for example, JP-A No. 10-129113, JP-A No. 11-20301).

Particularly, the inorganic oxide, among the inorganic fine particles, is preferable as the component contained in the treating composition, since it has an isoelectric point. Also, a particulate metal oxide is suitable since it shows a large increase in the particle diameter upon aggregation.

Concrete examples of the inorganic oxide include, silica (SiO$_2$), amphoteric compound of silica, titanium dioxide, alumina (Al$_2$O$_3$), zirconia and the like, but is not limited thereto.

Among the organic oxide, cationic silica is particularly preferable in terms of reactivity. The cationic silica may be treated by cationization on the surface of silica. For the cationization, a cationic compound is chemically and physically introduced to the surface of the silica. For example, the surface can be chemically cationized by coupling silanol groups of silica with an amino compound or treating silica with an amino compound. The surface can be physically cationized by mixing silica with a cationic compound in a solvent to allow the silica to physically adsorb the cationic compound and removing the solvent.

Among the above-described inorganic fine particles, cationic colloidal silica is particularly preferable. The ink set combining a treating composition using cationic colloidal silica may produce high image quality since cationic colloidal silica is highly reactive with a colorant.

Concrete examples of the anionic silica used as a core material include ST-ZL, ST-20, ST-30, ST-40, ST-C, ST-N, ST-O, ST-S, ST-50, ST-20L, ST-OL, ST-XS, ST-YL, ST-XL, ST-UP and ST-OUP (trade names, available from Nissan Chemical Industries, Ltd.), Cataloid SI-350 and SI-500 (trade names, available from Du Pont Company), Nipgel AY-220, AY-420 and AY-460 (trade names, available from Tosoh Silica Corporation). However, the present invention is not limited thereto and any silica treated with cation on the surface may suitably used.

The inorganic oxides are also commercially available, for example, as a cationized silica under the trade name of ST-AK from Nissan Chemical Industries, Ltd.; as alumina under the trade names of Alumina Sol 100, 200 and 520 from Nissan Chemical Industries, Ltd.; as titanium oxide under trade names of Titania Series from Idemitsu Kosan Co., Ltd. Some of these fine particles are available as aqueous dispersions.

Also, the treating composition may contain a component reactive with a colorant not having an isoelectric point in combination with the component reactive with a colorant having an isoelectric point.

According to the present invention, the component reactive with a colorant not having an isoelectric point which can be used in combination with the component reactive with a colorant having an isoelectric point may be an organic substance, inorganic substance or organic-inorganic composite. Further, it may be a polymer, monomer, fine particle.

Examples of the component reactive with a colorant contained in the treating composition are as follows.

The component reactive with the colorant may be a polymer. Particularly, the polymer contained in the treating composition is a cationic polymer.

Examples of the cationic polymer include cationic polymeric compounds such as polyallylamines, polyvinylamines, polyimines, polyvinylpyrrolidones, polyethyleneimines, polyvinylpyridines, aminoacetalated poly(vinyl alcohol)s, ionene polymers, polyvinylimidazoles, poly(vinylbenzyl phosphonium)s, polyalkylarylammonium, polyamidines, polyaminesulfones and cationic starch. The shape of the polymer chain may be a straight type or meshed-type, though it is not particularly limited. The shape of the particle may be any one of a sphere type, bead type or an amorphous type.

Also, the cationic compound which can be used in the present invention includes high molecular weight alkylamines, high molecular weight alkylammonium compounds or polyhydric amine compounds. The cationic polymes compounds can be used as a mixture.

Examples of the high molecular weight alkylamines or high molecular weight alkyl ammonium compounds include laurylamine, stearylamine, cetylamine, behenylamine, dimethylstearylamine, lauryltrimethylammonium, cetyltrimethylammonium, stearyltrimethylammonium, behenyltrimethylammonium, dioctyldimethylammonium, distearyldimethylammonium, stearyldimethylbenzylammonium and the like, or ethylene oxide additions thereof.

Concrete examples of the polyhydric amine compounds which can be used in the present invention include ethylenediamine, hexamethylenetetramine, piperazine, hexamethyleneimine, hexamethylenediamine, diethylenetriamine, tetraethylenepentamine, heptaethyleneoctamine, nanoethylenedecamine, triethylenetetramine, triethylene-bis(trimethylene)hexaine, bis(3-aminoethyl) aminemethylenediamine, N, N'-bis-(3-aminopropyl)putrescine, 1,4-diazacycloheptane, 1,5-diazacyclooctane, 1,4,11,14-tetraazacycloeicosane, 1,2-diaminopropane-3-ol, phenylenediamine, triaminobenzene, tetraaminobenzene, pentaminobenzene and the like.

Examples of the organic fine particles are fine particles of polystyrenes, styrene-acrylic copolymers, poly(methyl methacrylate)s, melamine resins, epoxy resins, silicone resins, benzoguanamine resins, polyamide resins, fluorine-containing resins, and polymers prepared by emulsion polymerization of $\alpha,\beta$-unsaturated ethylenic monomers.

The treating composition according to the present invention may contain cationic inorganic-organic composite particles or particulate cationic inorganic-organic composite particles.

The cationic inorganic-organic composite particles can be obtained by adsorbing a cationic organic compound on the surface of an inorganic particle, or by adsorbing a cationic inorganic compound on the surface of an organic compound. For example, the inorganic-organic composite particle coated with a cationic polymer can be obtained by dispersing an inorganic particle in a solvent such as water and slowly adding a cationic polymer in a solution in water or an aqueous organic solvent.

Examples of the cationic polymer are polyallylamines, polyvinylamines, polyimines, polyvinylpyrrolidones, polyethyleneimines, polyvinylpyridines, aminoacetalated poly(vinyl alcohol)s, ionene polymers, polyvinylimidazoles, poly(vinylbenzyl phosphonium) s, polyalkylarylammonium, polyamidines, polyaminesulfones, cationic starch and other cationic polymeric compounds.

The added amount of the compound reactive with the colorant contained in the treating composition is preferably more than 5 wt %, more preferably 15 wt % or more, based on the total amount of the treating composition. If the content is less than 5 wt %, the improving effect of the image quality is not sufficient. Also, a plurality of components can be used in combination. When the component reactive with the colorant is fine particles, it is preferably inorganic particles. When the inorganic particles are used, the ink set comprising a treating composition of inorganic particles and a recording composition containing a colorant can produce a high image quality, since the inorganic oxide is highly reactive with the colorant. Also, by adjusting the pH of the mixture of the treating composition and the recording composition so that the inorganic oxide can aggregate alone, it is possible to further improve the aggregation effect.

The component reactive with the colorant has an average particle diameter of preferably 500 nm or less, more preferably 200 nm or less in terms of ejection stability. That is, the diameter exceeds 500 nm, the ejection head may be clogged, leading ejection failure. Also, the average particle diameter may be determined by an optical particle size distributor, which shown as a particle diameter of 50% of the particle number.

Though the treating composition according to the present invention is prepared by dispersing the component reactive with the colorant contained therein in a vehicle mainly comprising water, when the component reactive with the colorant is fine particle, a deflocculation agent may be preferably used to stabilize the dispersion state. The deflocculation agent forms a double electric layer on the surface of a chargeable particle, which renders the particles electrostatically to repulse each other and prevent them from approach each other, thereby stabilizing the dispersion state. Since the fine particle is positively charged from the neutral through acid, examples of the deflocculation agent which can be used in the present invention include acetic acid, nitric acid, hydrochloric acid, formic acid, lactic acid and alkali metal salts thereof, zirconium compounds such as oxychloride zirconium hydrate, sodium pyrrolate, sodium hexamethalate, taurine and the like, but are not limited thereto.

The treating composition according to the present invention may be prepared, for example, by the following process.

When the component reactive with the colorant is water-soluble, the treating composition is combined with a liquid composition of the component dissolved in a solvent mainly comprising water. Meanwhile, when the component reactive with the colorant is fine particles, the fine particles, water and a deflocculation agent are preferably mixed to form a dispersion. Where necessary, a water-soluble solvent is added, and the mixture is defloculated in a defloculating machine.

Examples of the defloculating machine are high-speed and high-shear rotary agitating defloculating machine, dissolver, colloid mill, homogenizer and ultrasonic defloculating machine, which may be commercially available under the trade names of T. K. AUTO HOMO MIXER and T. K. HOMOMIC LINE FLOW from Tokushu Kika Kogyo Co., Ltd., Ultra-homomixer and NNK Colloidmill from Nippon Seiki Seisakusho Co., Ltd. The number of revolutions in deflocculation may be set according to the type and structure of the defloculating machine and is preferably from 500 rpm to 10000 rpm, and more preferably from 2000 rpm to 8000 rpm. The deflocculation is preferably performed at 5° C. to 100° C. for 0.01 to 68 hours, while varying depending on the type and structure of the defloculating machine.

The ion exchange of the treating composition containing the component reactive with the colorant is preferably carried out before the treating composition is mixed with other additives. Preferably, additives other than the component reactive with the colorant contained in the treating composition do not contain corrosive ions at high concentration. When other additive containing corrosive ions at high concentration is used, there is needed a subsidiary process to remove the corrosive ions, exchange them with non-corrosive ions and add an anticorrosion agent or antioxidant, in addition to the component reactive with the colorant. Additives which can be added to the treating composition are as follows.

The treating composition according to the present invention may contain an anti-corrosion agent. By adding an anti-corrosion, it is possible to prevent metal corrosion on a liquid contact surface such as a head. Examples of the anticorrosion agent which can be used in the present invention include acidic sulfites, sodium thiosulfate, (thiodiglycolic acid)ammonium, diisopropylammonium nitirite, pentaerythritol tetranitrate, dicyclohexyl ammonium nitrite, benzotriazole and the like. Among the above-described anticorrosion agent, benzotriazole is particularly preferred to reduce corrosion.

The anticorrosion is preferably contained in an amount of 0.001 to 10 wt % in the treating composition according to the present invention. If the amount is less than 0.001 wt %, the corrosion reduction effect is not sufficient, while if it exceeds 10 wt %, a part of the anticorrosion agent is separated or extracted, causing problems in the stability of the treating composition. Particularly, an amount of 0.1 to 2 wt % is preferred.

The treating composition according to the present invention may contain an antioxidant. By adding the antioxidant, it is possible to prevent metal corrosion on the liquid contact surface such as a head. Such antioxidants are roughly classified as radical acceptor antioxidants which feed proton to the resulting radical peroxide to stabilize, and peroxide separation antioxidants which convert hydroperoxide into a stable alcohol.

Typical examples of the radical acceptor antioxidants are phenolic compounds and amine compounds. Examples of the phenolic compounds are hydroquinone, gallates and other compounds; 2,6-di-tert-butyl-p-cresol, stearyl-β-(3,5-di-tert-butyl-4-hydroxyphenyl)propionate, 2,2β-methylenebis(4-methyl-6-tert-butylphenol), 2,2'-methylenebis(4-ethyl-6-tert-butylphenol), 4,4'-thiobis(3-methyl-6-tert-butylphenol), 1,1,3-tris(2-methyl-4-hydroxy-5-tert-butylphenyl)butane, 1,3,5-trimethyl-2,4,6-tris(3,5-di-tert-4-hydroxybenzyl)benzene, tris(3,5-di-tert-butyl-4-hydroxybenzyl)isocyanurate, tetrakis[methylene-3-(3', 5'-di-tert-butyl-4-hydroxyphenyl)propionate] methane, tannic acid and other hindered phenolic compounds. Examples of the amine compounds are N,N'-diphenyl-p-phenylenediamine, phenyl-β-naphthylamine, phenyl-α-naphthylamine, N,N'-β-naphthyl-p-phenylenediamine, N,N'-diphenylethylenediamine, phenothiazine, N,N'-di-sec-butyl-p-phenylenediamine and 4,4'-tetramethyl-diaminodiphenylmethane.

Typical examples of the peroxide separation antioxidants are sulfur compounds and phosphorus compounds. Examples of the sulfur compounds are dilauryl thiodipropionate, distearyl thiodipropionate, laurylstearyl thiodipropionate, dimyristyl thiodipropionate, distearyl β,β'-thiodibutyrate, 2-mercaptobenzimidazole and dilauryl sulfide. Examples of the phosphorus compounds are triphenyl phosphite, trioctadecyl phosphite, tridecyl phosphite, trilauryl trithiophosphite, diphenylisodecyl phosphite, trinonylphenyl phosphite and distearylpentaerythritol phosphite.

The amount of the antioxidant added to the treating composition according to the present invention preferably is in the range of 0.001 to 10 wt %. If the amount is less than 0.001 wt %, the corrosion reduction effect is not sufficient, while if it exceeds 10 wt %, a part of the antioxidant is separated or extracted, causing problems in the stability of the treating composition. Particularly, an amount of 0.1 to 2 wt % is preferred.

The treating composition may comprises a water-soluble organic solvent. Such water-soluble organic solvents include humectants and wetting agents. The wetting agent is added to prevent clogging of a recording head by drying.

Examples of the humectants are ethylene glycol, diethylene glycol, triethylene glycol, tetraethylene glycol, polyethylene glycol, propylene glycol, 1,3-butanediol, 1,3-propanediol, 2-methyl-1,3-propanediol, 1,4-butanediol, 1,5-pentanediol, 1,6-hexanediol, glycerol, 1,2,6-hexanetriol, 2-ethyl-1,3-hexanediol, 1,2,4-butanetriol, 1,2,3-butanetriol, petriol (3-methyl-1,3,5-pentanetriol) and other polyhydric alcohols; ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, propylene glycol monoethyl ether and other polyhydric alcohol alkyl etehrs; ethylene glycol monopenyl ether, ethylene glycol monobenzyl ether and other polyhydric alcohol aryl ethers; N-methyl-2-pyrrolidone, N-hydroxyethyl-2-pyrrolidone, 2-pyrrolidone, 1,3-dimethylimidazolidinone, ε-caprolactam and other nitrogen-containing heterocyclic compounds; formamide, N-methylformamide, N,N-dimethylformamide and other amides; monoethanolamine, diethanolamine, triethanolamine, monoethylamine, diethylamine, triethylamine and other amines; dimethyl sulfoxide, sulfolane, thiodiethanol and other sulfur-containing compounds; propylene carbonate, ethylene carbonate, and γ-butyrolactone. With water, each of these solvents can be used alone or in combination.

Preferred examples among them include diethyleneglycol, thiodiethanol, polyethyleneglycol 200 to 600, triethyleneglycol, glycerol, 1,2,6-hexanetriol, 1,2,4-butanetriol, phetriol, 1,5-pentanediol, N-methyl-2-pyrrolidone, N-hydroxyethylpyrrolidone, 2-pyrrolidone, 1,3-dimethylimidazolidinole. By using these compounds, it is possible to effectively prevent deterioration in injection properties caused by high solubility and moisture vaporization. Particularly preferred example of a solvent which is used for dispersion stability of the compounds according to the present invention include pyrrolidone derivatives such as N-hydroxyethyl-2-pyrrolidone.

The wetting agents are used for improving wettability between the treating composition and the recording medium and controlling the penetration rate. Compounds represented by following Formulae (I), (II), (III) and (IV) are preferred as the wetting agent. More specifically, polyoxyethylene alkylphenyl ether surfactants of Formula (I), acetylene glycol surfactants of Formula (II), polyoxyethylene alkyl ether surfactants of Formula (III), and polyoxyethylene polyoxypropylene alkyl ether surfactants of Formula (IV) can reduce the surface tension of the treating composition and improve the wettability to thereby increase the penetration rate.

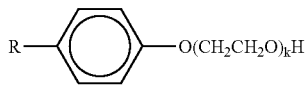

(I)

Wherein "R" represents a linear or branched hydrocarbon chain having 6 to 14 carbon atoms; and "k" represents an integer of 5 to 20.

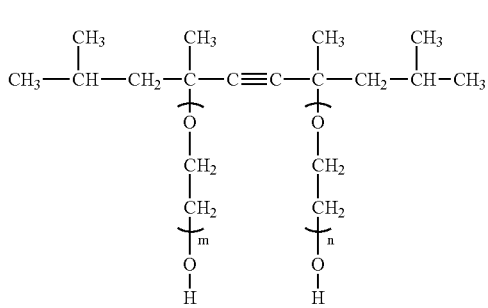

(II)

Wherein "m" and "n" are each an integer of 20 or less, and the total of "m" and "n" is more than 0 and equal to or less than 40.

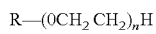

(III)

Wherein "R" represents a linear or branched hydrocarbon chain having 6 to 14 carbon atoms; and "n" represents an integer of 5 to 20.

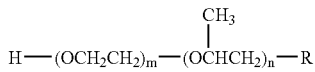

(IV)

Wherein "R" represents a hydrocarbon chain having 6 to 14 carbon atoms; and "m" and "n" are each an integer of 20 or less.

In addition to the compounds of Formulae (I), (II), (III) and (IV), the wetting agents also include diethylene glycol monophenyl ether, ethylene glycol monophenyl ether, ethylene glycol monoallyl ether, diethylene glycol monophenyl ether, diethylene glycol monobutyl ether, propylene glycol monobutyl ether, tetraethylene glycol chlorophenyl ether and other alkyl and aryl ethers of polyhydric alcohols, polyoxyethylene-polyoxypropylene block copolymers and other nonionic surfactants, fluorine-containing surfactants, ethanol, 2-propanol and other lower alcohols, of which diethylene glycol monobutyl ether is preferred.

The surfactant added to the treating composition is preferably charged with the same charge as the contained particles. When cationic colloidal silica with high aggregation effect is used as the particle, it is preferably a cationic compound.

Concrete examples of the cationic compound include quaternary ammonium salts, pyridinium salts, imidazoline compounds and the like. Examples of such cationic surfactants are lauryltrimethylammonium chloride, lauryldimethylbenzylammonium chloride, benzyltributylammonium chloride, benzalkonium, chloride, cetylpyridinium chloride and 2-heptadecenylhydroxyethylimidazoline. As the cationic surfactant, for example, Cation G 50 (Sanyo Chemical Industries, Ltd.) may be used.

Also, a positively charged ampotheric surfactant may be used. Upon using this, the pH of the treating composition should be lower than the isoelectric point of the amphoteric surfactant. Particularly, the amphoteric surfactant is preferably to have an isoelectric point near the pH of the mixture since the stability of the dispersion of the fine particles may be reduced when it contained in the mixture.

Concrete examples of the amphoteric surfactant include amino acid type amphoteric surfactants, compounds of RNHCH2—CH2COOH, betaine compounds, for example, stearyldimethylbetaine, lauryldihydroxyethylbetaine and the like. However, the amphoteric surfactant which can be used in the present invention is not limited thereto.

The treating composition may further comprise any of cationic surfactants such as quaternary ammonium salts, pyridinium salts and imidazoline compounds. Examples of such cationic surfactants are lauryltrimethylammonium chloride, lauryldimethylbenzylammonium chloride, benzyltributylammonium chloride, benzalkonium, chloride, cetylpyridinium chloride and 2-heptadecenylhydroxyethylimidazoline. However, the cationic surfactant which can be used in the present invention is not limited thereto.

The cationic surfactants work to reduce the surface tension and increase the wettability with the recording medium to thereby rapidly form the fine particle layer and to aggregate the anionic colorant, thus effectively improving the image quality.

The treating composition used in the ink set according to the present invention may contain a pH adjusting agent. Examples of the pH adjuster are lithium hydroxide, sodium hydroxide, potassium hydroxide and other alkali metal hydroxides; ammonium hydroxide, quaternary ammonium hydroxides, quaternary phosphonium hydroxides; lithium carbonate, sodium carbonate, potassium carbonate and other alkali metal carbonates; diethanolamine, triethanolamine and other amines; boric acid, hydrochloric acid, nitric acid sulfuric acid, acetic acid and other acids.

The surface tension of the treating composition is preferably from 20 to 60 mN/m and more preferably from 30 to 50 mN/m for better wettability to the recording medium and satisfactory granulation of the droplets.

The visicosity of the treating composition is preferably from 1.0 to 20.0 mPa·s and more preferably from 3.0 to 10.0 mPa·s for further stable discharge.

The pH of the treating composition is preferably from 3 to 11, and more preferably from 3 to 6 or from 8 to 11 for further stable dispersion of the fine particles.

[Recording composition]

Next, the recording composition which can be used in the ink set according to the present invention will be explained.

The colorant used in the recording composition according to the present invention include any one of a dye and a pigment. When the component reactive with the colorant contained in the treating composition, for example, fine particle is cationic, the colorant used in the recording composition is preferably an anionic dye or pigment in terms of improvement of image quality since aggregation between the fine particle and the colorant is accomplished by the electrical neutralization. That is, upon electric neutralization, a pigment in the dispersed state can more effectively aggregate than a dye in the dissolved state and thus, provide more improvement of image quality.

The pigment used in the recording composition in the ink set according to the present invention includes an organic pigment and an inorganic pigment. Examples of the organic pigments are azo, phthalocyanine, anthraquinone, quinacridone, dioxazine, indigo, thioindigo, perylene, isoindolenone, aniline black, azomethine, Rhodamine B lake, and carbon black pigments. Examples of the inorganic pigments are iron oxide, titanium oxide, calcium carbonate, barium sulfate, aluminum hydroxide, barium yellow, Prussian blue, cadmium red, chrome yellow, and metal powders.

Examples of the pigment dispersing agent having an anionic group include polyacrylic acid, polymethacrylic acid, styreneacryl resin, styrene maleic acid resin, water-soluble vinylnaphthaleneacryl resin, water-soluble vinylnaphthanlene maleic acid resin, β-naphthalenesulfonate formaline condensate, Carboxymethylcellulose, starch glycolic acid, sodium alginate, pectic acid, hyaluronic acid and the like. These anionic dispersing agent may be used in the form of an acid or a salt of an alkali metal such as sodium and potassium.

A representative example of the pigment having anionic groups on the surface include carbon blacks having carboxyl group or sulfonate group. Other examples include phthalocyanine pigments, anthraquinone pigments which may be treated by oxidation or with fuming sulfuric acid so that carboxyl group or sulfonate group is introduced to a part of the pigment particle.

Water-soluble dyes for use in the present invention include acidic dyes, direct dyes, basic dyes, reactive dyes and edible dyes (food dyes) as classified by the Color Index system, which have excellent water resistance and light resistance. Examples of dyes are as follows. Each of these dyes can be used in combination with each other or in combination with other colorants such as pigments within ranges not deteriorating the advantages of the present invention.

(a) Examples of the Acidic Dyes and Food Dyes Are:

Color Index Number (C. I.) Acid Yellow 17, 23, 42, 44, 79 and 142;

C. I. Acid Red 1, 8, 13, 14, 18, 26, 27, 35, 37, 42, 52, 82, 87, 89, 92, 97, 106, 111, 114, 115, 134, 186, 249, 254 and 289;

C. I. Acid Blue 9, 29, 45, 92 and 249;

C. I. Acid Black 1, 2, 7, 24, 26 and 94;

C. I. Food Yellow 3 and 4;

C. I. Food Red 7, 9 and 14;

C. I. Food Black 1 and 2.

(b) Examples of the Direct Dyes Are:

C. I. Direct Yellow 1, 12, 24, 26, 33, 44, 50, 86, 120, 132, 142 and 144;

C. I. Direct Red 1, 4, 9, 13, 17, 20, 28, 31, 39, 80, 81, 83, 89, 225 and 227;

C. I. Direct Orange 26, 29, 62 and 102;

C. I. Direct Blue 1, 2, 6, 15, 22, 25, 71, 76, 79, 86, 87, 90, 98, 163, 165, 199 and 202;

C. I. Direct Black 19, 22, 32, 38, 51, 56, 71, 74, 75, 77, 154, 168 and 171.

(c) Examples of the Basic Dyes Are:

C. I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91;

C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112;

C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155;

C. I. Basic Black 2 and 8.

(d) Examples of the Reactive Dyes Are:

C. I. Reactive Black 3, 4, 7, 11, 12 and 17;

C. I. Reactive Yellow 1, 5, 11, 13, 14, 20, 21, 22, 25, 40, 47, 51, 55, 65 and 67;

C. I. Reactive Red 1, 14, 17, 25, 26, 32, 37, 44, 46, 55, 60, 66, 74, 79, 96 and 97;

C. I. Reactive Blue 1, 2, 7, 14, 15, 23, 32, 35, 38, 41, 63, 80 and 95.

The colorant contained in the recording composition according to the present invention may have a colorant with or without an initial aggregation point. Particularly, by using the recording composition containing a colorant having an initial aggregation point, when the recording composition is mixed with the treating to form a mixture with a certain controlled pH, it is possible to produce aggregates as a simple substance composed of the component (fine particles) reactive with the colorant in the treating composition, aggregates composed of reaction products of the colorant and the fine particles and aggregates as a simple substance composed of the colorant. Therefore, the recording composition containing a colorant having an initial aggregation point, when combined with the treating composition, can increase viscosity of the mixture more than the recording composition containing a colorant without an initial aggregation point and preferably produce a record with high quality. The desired pH of the mixture can be adjusted by selection of types of the recording composition containing a colorant having an initial aggregation point and the treating composition, control of their pH or well-combination thereof.

The recording composition according to the present invention may contain an anti-corrosion agent. By adding an anti-corrosion, it is possible to prevent metal corrosion on a liquid contact surface such as a head. Examples of the anticorrosion agent which can be used in the present invention include acidic sulfites, sodium thiosulfate, (thiodiglycolic acid)ammonium, diisopropylammonium nitirite, pentaerythritol tetranitrate, dicyclohexylammonium nitrite, benzotriazole and the like. Among the above-described anticorrosion agent, benzotriazole is particularly preferred to reduce corrosion.

The anticorrosion is preferably contained in an amount of 0.001 to 10 wt % in the recording composition according to the present invention. If the amount is less than 0.001 wt %, the corrosion reduction effect is not sufficient, while if it exceeds 10 wt %, a part of the anticorrosion agent is separated or extracted, causing problems in the stability of the treating composition. Particularly, an amount of 0.1 to 2 wt % is preferred.

The recording composition according to the present invention may contain an antioxidant like the treating composition. By adding an antioxidant, it is possible to prevent metal corrosion on a liquid contact surface such as a head. The antioxidant is classified into radical acceptor types which applies a proton to a produced radical for stabilization and peroxide separation types modifying a stabilized alcohol.

The former include phenol compounds and amines compounds as described for the treating agent and the latter include sulfur compounds phosphorous compounds as described for the treating agent.

The added amount of the antioxidant used in the recording composition constituting the ink set according to the present invention is preferably 0.001 to 10 wt %. If the amount is less than 0.001 wt %, the corrosion reduction effect is not sufficient, while if it exceeds 10 wt %, a part of the antioxidant is separated or extracted, causing problems in the stability of the treating composition. Particularly, an amount of 0.1 to 2 wt % is preferred.

The recording composition used in the ink set according to the present invention preferably further comprise a water-soluble organic solvent in addition to the colorant, for the purpose of adjusting the physical properties of the recording composition desirably and preventing clogging of recording head nozzles. Such water-soluble organic solvents include humectants and wetting agents. The humectant is added to prevent the clogging of recording head nozzles.

Examples of the humectants are ethylene glycol, diethylene glycol, triethylene glycol, tetraethylene glycol, polyethylene glycol, propylene glycol, 1,3-butanediol, 1,3-propanediol, 2-methyl-1,3-propanediol, 1,4-butanediol, 1,5-pentanediol, 1,6-hexanediol, glycerol, 1,2,6-hexanetriol, 2-ethyl-1,3-hexanediol, 1,2,4-butanetriol, 1,2,3-butanetriol, petriol (3-methyl-1,3,5-pentanetriol) and other polyhydric alcohols; ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, propylene glycol monoethyl ether and other polyhydric alcohol alkyl etehrs; ethylene glycol monopenyl ether, ethylene glycol monobenzyl ether and other polyhydric alcohol aryl ethers; N-methyl-2-pyrrolidone, N-hydroxyethyl-2-pyrrolidone, 2-pyrrolidone, 1,3-dimethylimidazolidinone, ε-caprolactam and other nitrogen-containing heterocyclic compounds; formamide, N-methylformamide, N,N-dimethylformamide and other amides; monoethanolamine, diethanolamine, triethanolamine, monoethylamine, diethylamine, triethylamine and other amines; dimethyl sulfoxide, sulfolane, thiodiethanol and other sulfur-containing compounds; propylene carbonate, ethylene carbonate, and γ-butyrolactone. With water, each of these humectants can be used alone or in combination.

The wetting agents are used for improving wettability between the treating composition and the recording medium and controlling the penetration rate. As the wetting agent, polyoxyethylene alkylphenyl ether surfactants of Formula (I), acetylene glycol surfactants of Formula (II), polyoxyethylene alkyl ether surfactants of Formula (III), and polyoxyethylene polyoxypropylene alkyl ether surfactants of Formula (IV) are preferred. These surfactants can reduce the surface tension of the treating composition and improve the wettability to thereby increase the penetration rate.

In addition to the compounds of Formulae (I), (II), (III) and (IV), the wetting agents also include diethylene glycol monophenyl ether, ethylene glycol monophenyl ether, ethylene glycol monoallyl ether, diethylene glycol monophenyl ether, diethylene glycol monobutyl ether, propylene glycol monobutyl ether, tetraethylene glycol chlorophenyl ether and other alkyl and aryl ethers of polyhydric alcohols, polyoxyethylene-polyoxypropylene block copolymers and other nonionic surfactants, fluorine-containing surfactants, ethanol, 2-propanol and other lower alcohols, of which diethylene glycol monobutyl ether is preferred.

The treating composition and recording composition used in the ink set according to the present invention may further comprise any of antiseptic-antimold agents for preventing growth of microorganisms and for increasing storage stability and image quality stability.

Examples of such antiseptic-antimold agents are benzotriazole, sodium dehydroacetate, sodium sorbate, sodium 2-pyridinethiol-1-oxide, isothiazoline compounds, sodium benzoate and sodium pentachlorophenol.

Also, a commercially available antiseptic-antimold agents, for example, PROXEL LV(s) [Avecia Ltd.; (main ingredient: 1,2-benzothiazoline 3-one/sodium hydroxide)] may be used.

The recording composition used in the ink set according to the present invention may contain a pH adjusting agent. Examples of the pH adjuster are lithium hydroxide, sodium hydroxide, potassium hydroxide and other alkali metal hydroxides; ammonium hydroxide, quaternary ammonium hydroxides, quaternary phosphonium hydroxides; lithium carbonate, sodium carbonate, potassium carbonate and other alkali metal carbonates; diethanolamine, triethanolamine and other amines; boric acid, hydrochloric acid, nitric acid sulfuric acid, acetic acid and other acids.

The surface tension of the recording composition is preferably from 20 to 60 mN/m and more preferably from 30 to 50 mN/m for better wettability with the recording medium and satisfactory granulation of the droplets.

The visicosity of the recording composition is preferably from 1.0 to 20.0 mPa·s and more preferably from 3.0 to 10.0 mPa·s for further stable discharge.

The pH of the recording composition is preferably from 3 to 11, and more preferably from 6 to 10 for preventing corrosion of metal members to be in contact with the composition.

As described above, it is possible to obtain an image record with high quality by applying the ink set using the treating composition and the recording composition on a recording media, bring the treating composition and the recording composition into contact for reaction to form an image. The reaction between the component contained in the treating composition and the colorant contained in the recording composition and its effect can be roughly summarized as follows. However, the present invention is not limited to the following description.

The component contained in the treating composition constituting the ink set according to the present invention, for example, fine particle, have charge on the surface and show repulsive interaction with each other by the surface charge, thereby being stably dispersed. Also, the fine particles have a isoelectric point. When the recording composition containing a colorant having an opposite polarity with the fine particles comes in contact with the treating composition, the colorant are strongly adsorbed on the fine particles by electrical interaction. Since the surface charge of the fine particles are neutralized by the charge of the colorant, the repulsive interactions between the colorants and between the fine particles vanish to form large aggregates. Also, since the water soluble groups of the colorant such as carbonyl group and sulfonyl group are concealed by the component upon adsorption, the solubility of the aggregates in water is dramatically reduced, which makes the aggregates much bigger. Further, by adjusting the pH of the mixture to be near the pH at the isoelectric point of the component contained in the treating composition, the fine particles aggregate as a simple substance. If the formation of such aggregates rapidly occurs, the aggregates are trapped in the porous part of a recording medium when the recording composition and the treating composition permeate the recording medium. As a result, the colorant cannot migrate and thus, it is possible to effectively prevent feathering and color bleed. In addition, due to the high glossy which the particles themselves have, it is possible to improve the glossy of a print obtained by reaction of the recording composition.

Also, the component contained in the treating composition, for example, fine particles and the colorant contained in the recording composition form particulate aggregates, which are accumulated in the form of a stone wall to form a permeable layer near the surface of a recording medium. Since the layer is permeable, a vehicle may rapidly permeate to the recording medium, whereby color bleed and dry property are improved. If a polymer is used in place of the component reactive with the colorant according to the present invention, the polymer forms a layer on the surface of a recording medium to interfere with the permeation of a vehicle. Consequently, dry property is deteriorate, causing stain of the hand or image effects when the print is touched by the hand.

Also, since the aggregates of the cationic component and the anionic colorant are accumulated near the surface of a recording medium, image density increases. Further, since the permeation of the recording composition to the back of the recording medium is inhibited, both-sides print can be favorably performed. In addition, since the water-soluble groups of the contained in the anionic colorant are concealed by the cationic component upon adsorption, the solubility of the aggregates in water is reduced, which make water resistance improved. As described above, it is possible to obtain a record with print quality higher than that of the prior arts.

Next, the image forming apparatus for performing image formation by an image forming process (ink jet process) using the ink set according to the present invention will be explained with reference to the drawings.

Figure 3:
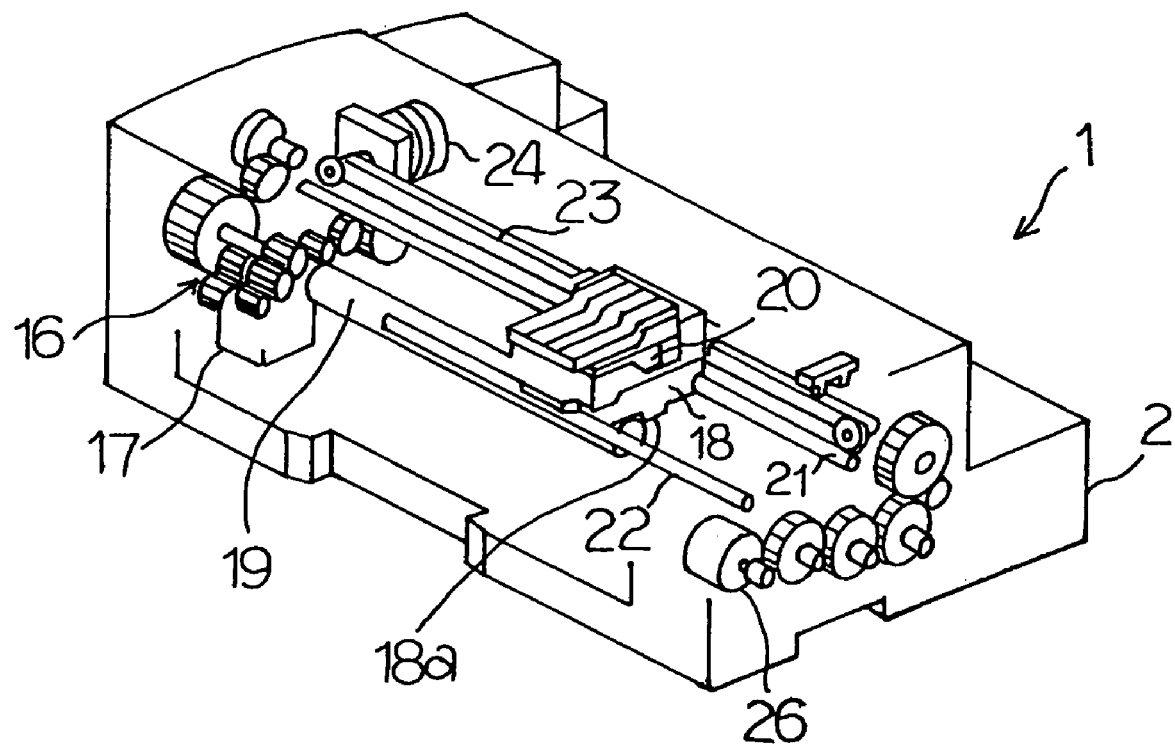
FIG. 3 is a perspective view schematically showing the construction of an embodiment of the image forming apparatus according to the present invention.

FIG. 3 is a perspective view schematically showing the construction of the image forming apparatus according to the present invention. As shown in FIG. 3, the cartridge 20 receiving the treating composition and the recording composition separately from each other is received in a carriage 18. That is, separate cartridges 20 are provided for the treating composition or for the recording composition of each color and attached in the state that the respective liquids are separated from each other. In this construction, the treating composition and the recording composition are supplied to a recording head 18a loaded on the carriage 18 from the cartridge 20. In FIG. 3, the recording head surface 18a faces downward and thus is not shown.

The recording head 18a of the carriage 18 moves by action of a timing belt 23 while being guided by guide shafts 21 and 22. The timing belt 23 is driven by a main scanning motor 24. The recording medium is arranged by a platen 19 so as to face the recording head 18a. FIG. 3 also illustrates a cabinet 2, a gear mechanism 16, a secondary scanning motor 17, gear mechanisms 25, 27 and another main scanning motor 26.

Figure 4:
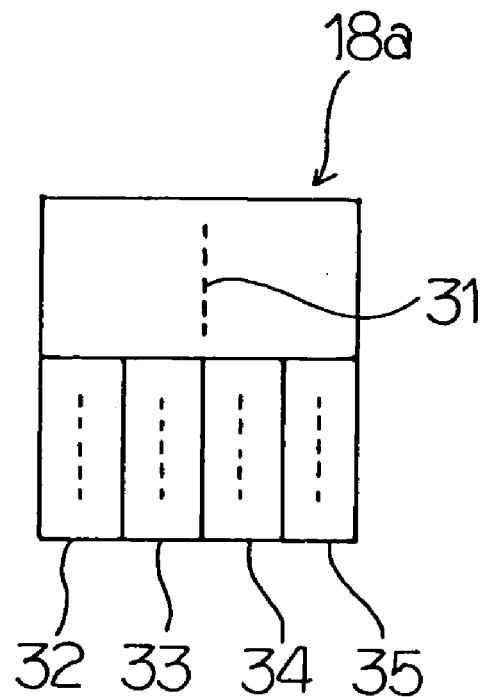
FIG. 4 is a schematic sectional view of discharge nozzles of a recording head for use in a carriage of the image forming apparatus of FIG. 3.

FIG. 4 is a schematic enlarged view of the nozzles of the recording head 18a.

For example, a nozzle 31 for discharging the treating composition is arranged in a vertical direction. Nozzles 32, 33, 34 and 35 discharge yellow, magenta, cyan and black recording compositions, respectively, corresponding to the cartridges therein.

Figure 5:
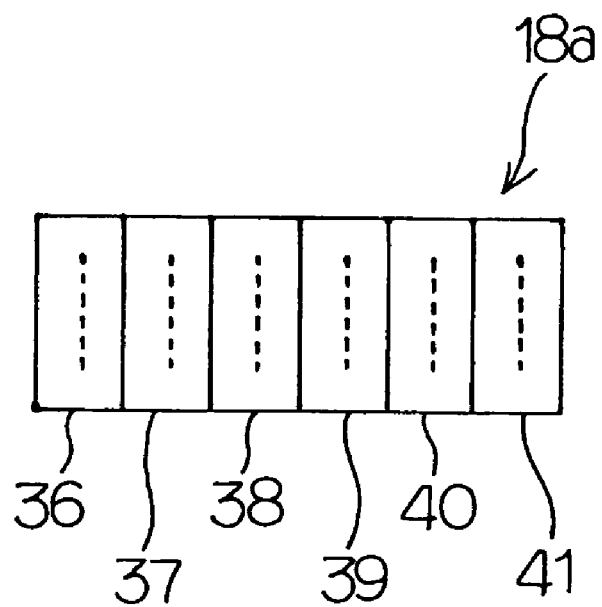
FIG. 5 is a schematic sectional view of other discharge nozzles of a recording head for use in a carriage of the image forming apparatus of FIG. 3.

FIG. 5 shows another configuration of the recording head 18a, in which all the nozzles are arranged in line. In FIG. 5, for example, nozzles 36 and 41 discharge the treating composition. Nozzles 37, 38, 39 and 40 discharge yellow, magenta, cyan and black recording compositions, respectively, corresponding to the cartridges therein.

The recording head 18a having this configuration equips the nozzles for discharging the treating composition at both horizontal ends and can print in both directions of its movement with the guidance of the guide shafts 21 and 22. More specifically, the recording head 18a can apply the treating composition first to the recording medium and then apply the color recording compositions thereonto, or vise vista, in both directions. This can reduce difference in image density between the two moving directions of the recording head 18a.

Each cartridge in the image forming apparatus can be replaced for another treating composition or recording composition. The cartridges may be integrated with the recording head 18a.

Figure 6:
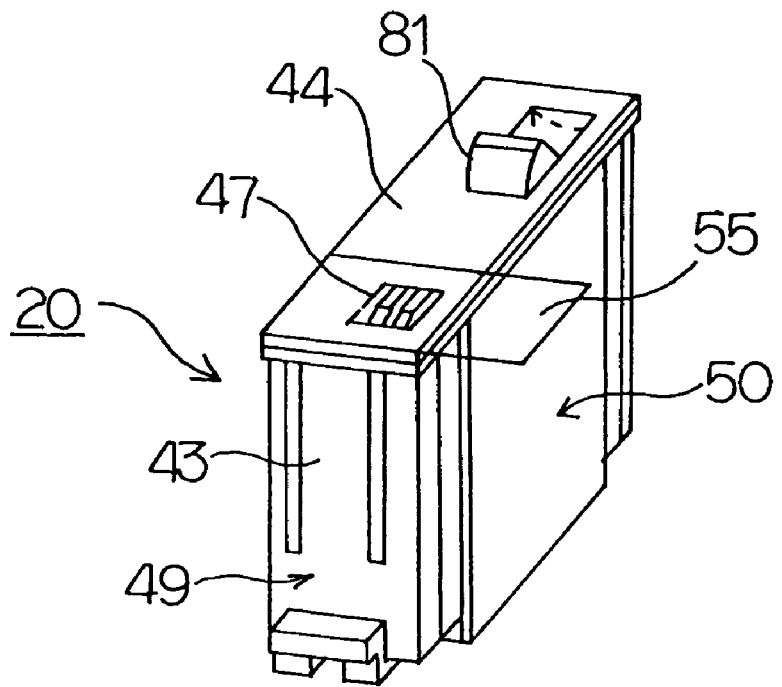
FIG. 6 is a schematic perspective view of a cartridge for housing the treating composition or recording composition for use in the image forming apparatus of the present invention.
Figure 7:
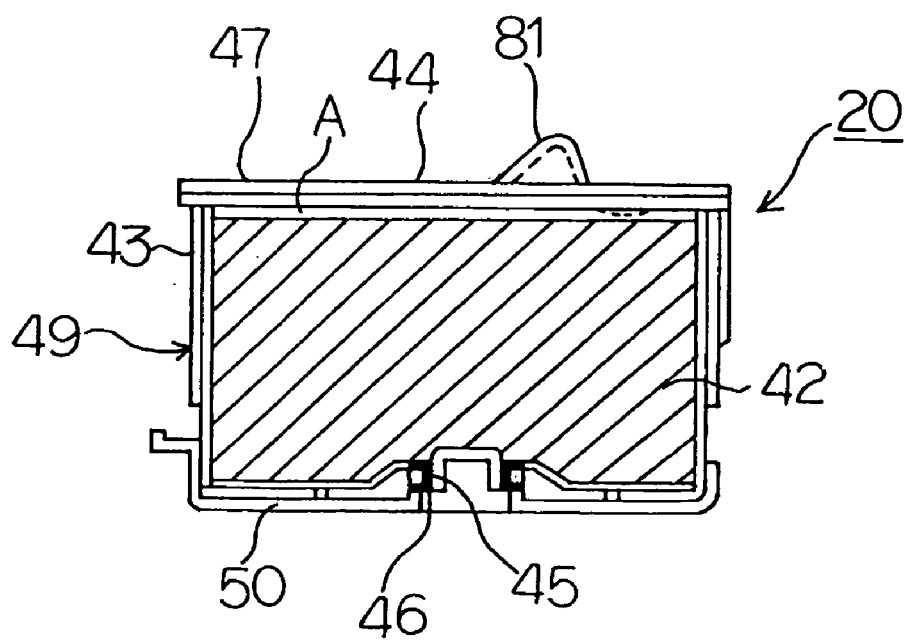
FIG. 7 is a schematic elevational view in section of an inner configuration of the cartridge of FIG. 6.

FIGS. 6 and 7 are each a schematic perspective view and schematic elevational view in section of a cartridge capable of housing the treating composition or recording composition of the present invention. The cartridge 20 shown in FIGS. 6 and 7 can house whichever of the treating composition and the recording compositions.

With reference to FIGS. 6 and 7, the cartridge 20 comprises a cartridge cabinet 49 housing a liquid absorber 42 which absorbs one of the recording compositions and treating composition. The liquid absorber 42 is porous and includes the absorbed recording composition or treating composition. The cartridge cabinet 49 comprises a case 43 having a wide top opening, and an upper lid member 44 on the top opening. A is a clearance. The upper lid member 44 as an air release port 47 with a sealant 55, and a projection 81 for attachment and detachment of the cartridge. The case 43 of the cartridge cabinet 49 has a liquid supply port for feeding each composition to the recording head 18a. A sealing 46 is engaged in the inner periphery of the liquid supply port 45. The cartridge cabinet 49 equips a cap member 50 provided with protrusion for preventing the leakage of the liquid 51 for plugging the liquid supply port 45 in order to prevent the leakage of the liquid (composition) before the cartridge is attached to the image forming apparatus. Also, 71 represents a part for locating the cartridge, 81a represents a finger part for detachment of the cartridge, 82 represents a concave part for detachment of the cartridge.

In the present invention, it is most preferred that the each recording head 18a ejects one of the recording compositions and treating composition by ink-jet recording system so as to the individual droplets of the compositions are superimposed at one position. However, the present invention is not limited to this configuration. For example, the present invention also encompasses a configuration in which the treating composition is applied intermittently and the recording compositions are superimposed on the enlarged treating composition due to bleeding, and a configuration in which the treating composition is applied only to the outline of an image and the recording compositions are superimposed partially thereon.

EXAMPLES

Now, the present invention will be explained in further detail by the following examples. However, the present invention is not limited thereto. Also, all parts in the text are by weight. The total amount of the composition in the prescription of each liquid is 100 parts by weight. Further, the zeta potential in the text is the result as measured at a solid concentration of 1.4% using a zeta potential meter.

Example 1

Firstly, in order to measure isoelectric point at different pH values and particle diameter of a simple-substance particle, particle dispersions 1 to 14 which had been set to various pH values were formulated by the following compositions.

| <Fine particle dispersion 1> | |
|---|---|
| Cationic colloidal silica (SNOW TEX AK; Nissan Chemical Industries, Ltd.) | 1.4 parts |
| Water | balance |
| <Fine particle dispersion 2> | |
| Cationic colloidal silica (SNOW TEX AK; Nissan Chemical Industries, Ltd.) | 1.4 parts |
| LiOH | 0.05 parts |
| Water | balance |
| <Fine particle dispersion 3> | |
| Cationic colloidal silica (SNOW TEX AK; Nissan Chemical Industries, Ltd.) | 1.4 parts |
| LiOH | 0.08 parts |
| Water | balance |
| <Fine particle dispersion 4> | |
| Cationic colloidal silica (SNOW TEX AK; Nissan Chemical Industries, Ltd.) | 1.4 parts |
| LiOH | 0.15 parts |
| Water | balance |
| <Fine particle dispersion 5> | |
| Cationic colloidal silica (SNOW TEX AK; Nissan Chemical Industries, Ltd.) | 1.4 parts |
| LiOH | 0.30 parts |
| Water | balance |
| <Fine particle dispersion 6> | |
| Cationic colloidal silica (SNOW TEX AK; Nissan Chemical Industries, Ltd.) | 1.4 parts |
| LiOH | 0.35 parts |
| Water | balance |
| <Fine particle dispersion 7> | |
| Cationic colloidal silica (SNOW TEX AK; Nissan Chemical Industries, Ltd.) | 1.4 parts |
| LiOH | 0.38 parts |
| Water | balance |
| <Fine particle dispersion 8> | |
| Cationic colloidal silica (SNOW TEX AK; Nissan Chemical Industries, Ltd.) | 1.4 parts |
| LiOH | 0.40 parts |
| Water | balance |
| <Fine particle dispersion 9> | |
| Cationic colloidal silica (SNOW TEX AK; Nissan Chemical Industries, Ltd.) | 1.4 parts |
| LiOH | 0.50 parts |
| Water | balance |
| <Fine particle dispersion 10> | |
| Cationic colloidal silica (SNOW TEX AK; Nissan Chemical Industries, Ltd.) | 1.4 parts |
| LiOH | 0.55 parts |
| Water | balance |
| <Fine particle dispersion 11> | |
| Cationic colloidal silica (SNOW TEX AK; Nissan Chemical Industries, Ltd.) | 1.4 parts |
| LiOH | 0.60 parts |
| Water | balance |
| <Fine particle dispersion 12> | |
| Cationic colloidal silica (SNOW TEX AK; Nissan Chemical Industries, Ltd.) | 1.4 parts |
| LiOH | 0.80 parts |
| Water | balance |
| <Fine particle dispersion 13> | |
| Cationic colloidal silica (SNOW TEX AK; Nissan Chemical Industries, Ltd.) | 1.4 parts |
| LiOH | 1.05 parts |
| Water | balance |
| <Fine particle dispersion 14> | |
| Cationic colloidal silica (SNOW TEX AK; Nissan Chemical Industries, Ltd.) | 1.4 parts |
| LiOH | 1.22 parts |
| Water | balance |

The fine particle dispersions 1 to 14 prepared above were measured for zeta potential and particle diameter. The results are shown in FIG. 8.

Figure 8:
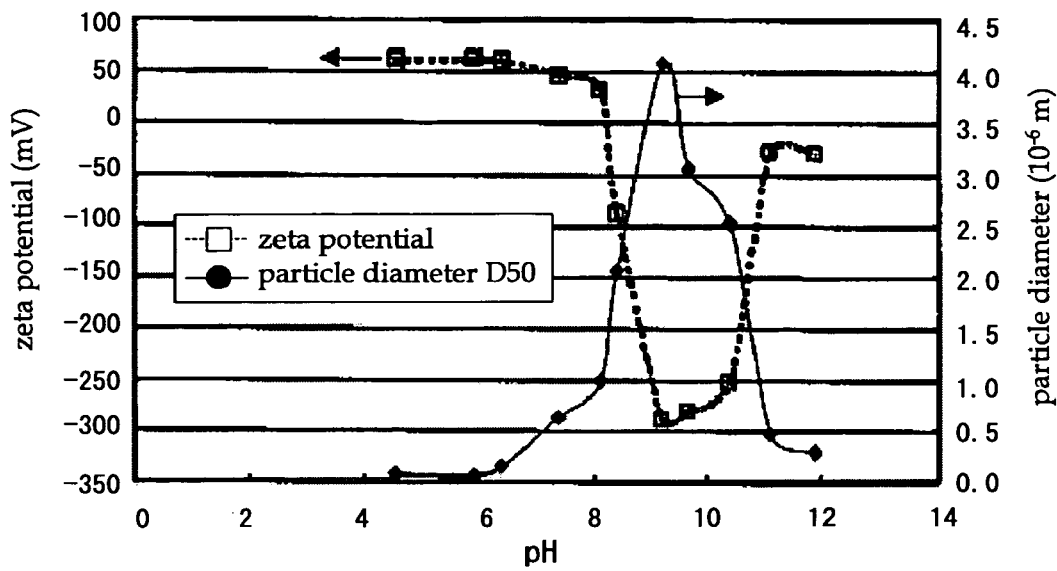
FIG. 8 is a view showing the relation between the pH change in the dispersion of the fine particles in Example 1 and zeta potential and particle diameter.

From the results shown in FIG. 8, the pH (a), at which the change of zeta potential ($\zeta'$) from the isoelectric point is −2.5, is 5.9 and the pH (c) at the isoelectric point is 8.2. Also, the pH (b) at a specific point, where the zeta potential is the minimum value in the basic side from the pH (c=8.2) of the isoelectric point, is 9.2 and the pH (e) at a specific point, where the particle diameter reduces by elution of cationic colloidal silica, is 10.4.

From these results, it is noted that the cationic colloidal silica aggregates alone under conditions of a zeta potential ($\zeta$) of 60 mV or less and a pH of 5.9 or more. Also, the pH range in which the particle diameter becomes two times of the original average particle diameter (f), as the aggregation proceeds, is 6.4 or more. Further, at a pH of 10.4 or more, the silica is eluted and the particle diameter is reduced.

Example 2

In order to examine the relation between the pH change and the viscosity change of a mixture which was formed by mixing a treating composition and a recording composition of the ink set according to the present invention, treating compositions a to f and recording compositions A to J were prepared by the prescriptions described below.

Also, the component reactive with the colorant contained in the treating composition, the fine particle having an isoelectric point was the same as one used in Example 1.

| <Treating composition a> | |
|---|---|
| Cationic colloidal silica (SNOW TEX AK; Nissan Chemical Industries, Ltd.) | 14.0 parts |
| Glycerine | 10.0 parts |
| Octanediol | 1.0 parts |
| Cationic surfactant (Cation G 50; Sanyo Chemical Industries, Ltd.) | 2.0 parts |
| Benzotriazole | 1.0 parts |
| PROXEL LV(s) (Avecia Ltd.) | 0.2 parts |
| Acetic acid | 5.7 parts |
| Water | balance |

-continued

<Treating composition b>

| | |
|---|---|
| Cationic colloidal silica (SNOW TEX AK; Nissan Chemical Industries, Ltd.) | 14.0 parts |
| Glycerine | 10.0 parts |
| Octanediol | 1.0 parts |
| Cationic surfactant (Cation G 50; Sanyo Chemical Industries, Ltd.) | 2.0 parts |
| Benzotriazole | 1.0 parts |
| PROXEL LV(s) (Avecia Ltd.) | 0.2 parts |
| Acetic acid | 2.9 parts |
| Water | balance |

<Treating composition c>

| | |
|---|---|
| Cationic colloidal silica (SNOW TEX AK; Nissan Chemical Industries, Ltd.) | 14.0 parts |
| Glycerine | 10.0 parts |
| Octanediol | 1.0 parts |
| Cationic surfactant (Cation G 50; Sanyo Chemical Industries, Ltd.) | 2.0 parts |
| Benzotriazole | 1.0 parts |
| PROXEL LV(s) (Avecia Ltd.) | 0.2 parts |
| Acetic acid | 0.75 parts |
| Water | balance |

<Treating composition d>

| | |
|---|---|
| Cationic colloidal silica (SNOW TEX AK; Nissan Chemical Industries, Ltd.) | 14.0 parts |
| Glycerine | 10.0 parts |
| Octanediol | 1.0 parts |
| Cationic surfactant (Cation G 50; Sanyo Chemical Industries, Ltd.) | 2.0 parts |
| Benzotriazole | 1.0 parts |
| PROXEL LV(s) (Avecia Ltd.) | 0.2 parts |
| Acetic acid | 0.38 parts |
| Water | balance |

<Treating composition e>

| | |
|---|---|
| Cationic colloidal silica (SNOW TEX AK; Nissan Chemical Industries, Ltd.) | 14.0 parts |
| Glycerine | 10.0 parts |
| Octanediol | 1.0 parts |
| Cationic surfactant (Cation G 50; Sanyo Chemical Industries, Ltd.) | 2.0 parts |
| Benzotriazole | 1.0 parts |
| PROXEL LV(s) (Avecia Ltd.) | 0.2 parts |
| Acetic acid | 0.1 parts |
| Water | balance |

<Treating composition f>

| | |
|---|---|
| Cationic colloidal silica (SNOW TEX AK; Nissan Chemical Industries, Ltd.) | 14.0 parts |
| Glycerine | 10.0 parts |
| Octanediol | 1.0 parts |
| Cationic surfactant (Cation G 50; Sanyo Chemical Industries, Ltd.) | 2.0 parts |
| Benzotriazole | 1.0 parts |
| PROXEL LV(s) (Avecia Ltd.) | 0.2 parts |
| Water | balance |

<Recording composition A>

| | |
|---|---|
| Cabojet 300 (Cabot Corporation, a self-dispersible pigment) | 10.0 parts |
| 1,3-butanediol | 22.5 parts |
| Glycerine | 7.5 parts |
| 2-pyrrolidone | 2.0 parts |
| Sodium dehydroacetate | 0.2 parts |
| Sodium thiosulfate | 0.2 parts |
| Water | balance |

<Recording composition B>

| | |
|---|---|
| Cabojet 300 (Cabot Corporation, a self-dispersible pigment) | 10.0 parts |
| 1,3-butanediol | 22.5 parts |
| Glycerine | 7.5 parts |
| 2-pyrrolidone | 2.0 parts |
| Sodium dehydroacetate | 0.2 parts |
| Sodium thiosulfate | 0.2 parts |
| LiOH | 0.17 parts |
| Water | balance |

<Recording composition C>

| | |
|---|---|
| Cabojet 300 (Cabot Corporation, a self-dispersible pigment) | 10.0 parts |
| 1,3-butanediol | 22.5 parts |
| Glycerine | 7.5 parts |
| 2-pyrrolidone | 2.0 parts |
| Sodium dehydroacetate | 0.2 parts |
| Sodium thiosulfate | 0.2 parts |
| LiOH | 0.35 parts |
| Water | balance |

<Recording composition D>

| | |
|---|---|
| Cabojet 300 (Cabot Corporation, a self-dispersible pigment) | 10.0 parts |
| 1,3-butanediol | 22.5 parts |
| Glycerine | 7.5 parts |
| 2-pyrrolidone | 2.0 parts |
| Sodium dehydroacetate | 0.2 parts |
| Sodium thiosulfate | 0.2 parts |
| LiOH | 0.61 parts |
| Water | balance |

<Recording composition E>

| | |
|---|---|
| Cabojet 300 (Cabot Corporation, a self-dispersible pigment) | 10.0 parts |
| 1,3-butanediol | 22.5 parts |
| Glycerine | 7.5 parts |
| 2-pyrrolidone | 2.0 parts |
| Sodium dehydroacetate | 0.2 parts |
| Sodium thiosulfate | 0.2 parts |
| LiOH | 0.80 parts |
| Water | balance |

<Recording composition F>

| | |
|---|---|
| Cabojet 300 (Cabot Corporation, a self-dispersible pigment) | 10.0 parts |
| 1,3-butanediol | 22.5 parts |
| Glycerine | 7.5 parts |
| 2-pyrrolidone | 2.0 parts |
| Sodium dehydroacetate | 0.2 parts |
| Sodium thiosulfate | 0.2 parts |
| LiOH | 1.05 parts |
| Water | balance |

<Recording composition G>

| | |
|---|---|
| Cabojet 300 (Cabot Corporation, a self-dispersible pigment) | 10.0 parts |
| 1,3-butanediol | 22.5 parts |
| Glycerine | 7.5 parts |
| 2-pyrrolidone | 2.0 parts |
| Sodium dehydroacetate | 0.2 parts |
| Sodium thiosulfate | 0.2 parts |
| LiOH | 1.22 parts |
| Water | balance |

<Recording composition H>

| | |
|---|---|
| Cabojet 300 (Cabot Corporation, a self-dispersible pigment) | 10.0 parts |
| 1,3-butanediol | 22.5 parts |
| Glycerine | 7.5 parts |
| 2-pyrrolidone | 2.0 parts |
| Sodium dehydroacetate | 0.2 parts |
| Sodium thiosulfate | 0.2 parts |
| LiOH | 2.5 parts |
| Water | balance |

<Recording composition I>

| | |
|---|---|
| Cabojet 300 (Cabot Corporation, a self-dispersible pigment) | 10.0 parts |
| 1,3-butanediol | 22.5 parts |
| Glycerine | 7.5 parts |
| 2-pyrrolidone | 2.0 parts |
| Sodium dehydroacetate | 0.2 parts |
| Sodium thiosulfate | 0.2 parts |
| LiOH | 4.5 parts |
| Water | balance |

<Recording composition J>

| | |
|---|---|
| Hoodblack2 (dye) | 10.0 parts |
| 1,3-butanediol | 22.5 parts |

-continued

| | |
|---|---|
| Glycerine | 7.5 parts |
| 2-pyrrolidone | 2.0 parts |
| Sodium dehydroacetate | 0.2 parts |
| Sodium thiosulfate | 0.2 parts |
| Water | balance |

Figure 9:
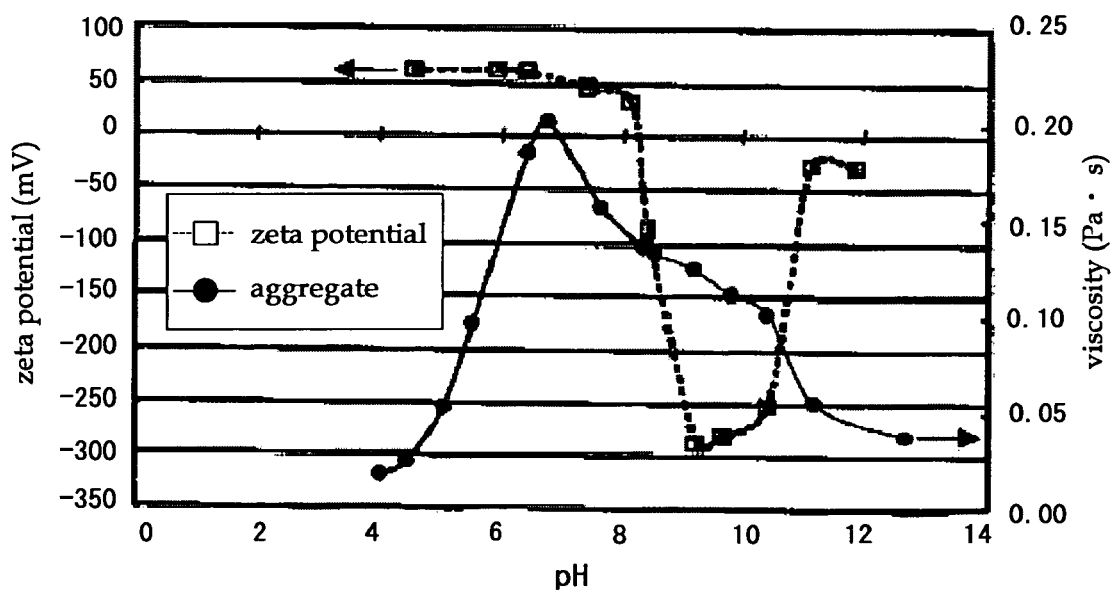
FIG. 9 is a view showing the relation between the pH change in the mixture of the treating composition and the recording composition in Example 2 and zeta potential and particle diameter.

The treating compositions a to f and the recording compositions A to I as prepared above (recording composition J was used in Example 3) were formulated into ink sets as described in Table 1 below. The treating composition and the recording composition were mixed in a ratio (treating composition:recording composition, by weight) of 0.7:10 to form a mixture, which was measured for its pH and viscosity. The results are shown in Table 1 and FIG. 9. Also, the change of Zeta potential of the fine particles is shown in FIG. 9.

The viscosity (Pa·s) is a value as measured at a revolution speed of 900 ($s^{-1}$) (25□±1□, cone:φ20 mm), when the seed is accelerated from 1 to 100 ($s^{-1}$) at a rate of 0.18 ($s^{-1}$) and then decellerated from 1000 to 1 ($s^{-1}$) at a rate of −0.18 ($s^{-1}$).

TABLE 1

| Treating composition | Recording composition | Ink Set | Mixture (pH) | Viscosity (Pa · s) |
|---|---|---|---|---|
| a | A | [1] | 4.02 | 0.0173 |
| b | A | [2] | 4.46 | 0.0237 |
| c | A | [3] | 5.06 | 0.0527 |
| d | A | [4] | 5.52 | 0.0962 |
| e | A | [5] | 6.40 | 0.185 |
| f | A | [6] | 6.73 | 0.202 |
| f | B | [7] | 7.64 | 0.157 |
| f | C | [8] | 8.34 | 0.137 |
| f | D | [9] | 8.54 | 0.133 |
| f | E | [10] | 9.20 | 0.125 |
| f | F | [11] | 9.80 | 0.112 |
| f | G | [12] | 10.4 | 0.104 |
| f | H | [13] | 11.2 | 0.0552 |
| f | I | [14] | 12.69 | 0.0377 |

It was noted that as the viscosity of the formulated ink set increases, the migration of the colorant becomes more difficult and thereby, the diffusion in the vicinity of the surface of a recording medium, for example, a paper, becomes difficult, which inhibits color bleed or feathering and makes the permeation into the paper difficult, increasing image density.

Thus, from the result of Example 1, it was noted that the viscosity is increased to 0.1 (Pa·s) or more in the range of the pH value (a) of 5.9, where the aggregation of fine particles as a simple substance is initiated, to the pH value (e) of 10.4, where the particle diameter is reduced by the elution of silica.

From these results, by using an ink set comprising a treating composition and a recording composition to make the pH of the mixture ($_\gamma$) satisfy the range of $5.9<_\gamma<10.4$, it is possible to obtain high image properties by an image forming process comprising reacting the two liquids on a recording medium.

A particularly effective range is where the average particle diameter (f) when the fine particles are being diffused in the treating composition and the average particle diameter (g) of the fine particles as a simple substance at the pH ($_\gamma$) of the mixture of the ink set satisfy g/f>2, that is, the aggregate formed of the fine particles alone increases. Here, $_\gamma$ is in the range $4<_\gamma<10.4$ and the viscosity increases.

The viscosity was high in the range of c±2.0 of the pH (c=8,2) at the isoelectric point determined in Example, that is, in the pH range of 6.2 to 10.2, particularly, in the range of c±1.5, that is, in the pH range of 6.7 to 9.7, with the maximum viscosity at pH 6.7.

From the above, it is noted that the ink sets [6] to [14] among the ink sets described in Table 1 shows high image properties at ±2.0, particularly the ink set [6] shows the highest image properties.

Example 3 (Experiments 1 to 6)

The treating compositions a, d and f and the recording compositions A, E, H and J prepared in Example 2 were formulated as described in Table 2 below to prepare ink sets. Each ink set was filled (charged) in a cartridge and loaded on IpsioJet300: (Ricoh Co., Ltd.) printer. A printing was performed and the resulting print was evaluated. Also, another printing was performed at a constant ratio and total amount of the adsorbed amount (Mj1) of the treating composition and the adsorbed amount (Mj2) of the recording composition. As described in the prescriptions of the respective treating compositions and the respective recording compositions, the component reactive with a colorant contained in the treating compositions was the same and the colorant contained in the recording compositions was the same, but pH was different. Therefore, the pH values ($_\gamma$) of the mixtures are different except for some cases as described in Table 2.

The printed matters were evaluated for image density, color bleed, feathering, cockling and water resistance. Evaluation of each category was carried out on the basis of the evaluation of recorded image and evaluation criteria described below. The results are shown in Table 2. In the table, Mj1, Mj2 and Mj1+Mj2 are expressed in $g/m^2$ unit (applicable for tables below).

<Process for Evaluation of Image Quality>

(1) A patch pattern of a solid portion of a black (Bk) ink was printed on My paper TA (Ricoh Co., Ltd.) using an image density printer to obtain a sample. The patch was measured for image density by X-Rite.

Evaluation Criteria:

Failure: image density being less than 1.05 times of that of a print printed with the same adsorbed amount (Mj2) of the recording composition without a treating composition.

Good: image density being 1.05 times to 1.10 times of that of a print printed with the same adsorbed amount (Mj2) of the recording composition without a treating composition.

Excellent: image density being more than 1.10 times of that of a print printed with the same adsorbed amount (Mj2) of the recording composition without a treating composition.

(2) Color Bleed

A pattern having the character Y in the solid portion of a black (Bk) ink was printed on My Paper TA (Ricoh Co., Ltd.) using a printer to obtain a print sample. The bleed in the interface of the pattern was examined with the naked eye.

Evaluation Criteria:

Failure: Blurring being observed with unclear outlines of the character being unclear.

Good: Blurring being observed at a part of the outlines of the character, but being not remarkable.

Excellent: No blurring being observed at the outlines of the character.

(3) Feathering

A pattern having a character in the solid portion of a black (Bk) ink was printed on My Paper TA (Ricoh Co., Ltd.) using a printer to obtain a print sample. The feathering of the character was examined with the naked eye.

Evaluation Criteria:

Failure: Blurring being observed with unclear outlines of the character being unclear.

Good: Blurring being observed at a part of the outlines of the character, but being not remarkable.
Excellent: No blurring being observed at the outlines of the character.
(4) Cockling
A pattern having a solid portion (15 cm×15 cm) of a black (Bk) ink was printed on My Paper TA (Ricoh Co., Ltd.) using a printer to obtain a print sample.

Evaluation Criteria:
Failure: The patch part of the paper being swollen and poppling and the paper striking the printer head, making the printing impossible.
Good: The patch part of the paper being slightly swollen and poppling but no difficulty in normal printing.
Excellent: The patch part of the paper being little swollen an poppling.
(5) Water Resistance
A pattern having a character of a black (Bk) ink was printed on My Paper TA (Ricoh Co., Ltd.) using a printer to obtain a print sample. This sample was dipped and shaken in water for 1 minute and examined with the naked eye.

Evaluation Criteria:
Failure: Bleed with the character being unclear.
Good: Bleed of the character but not remarkable.
Excellent: No bleed of the character.

ering. Meanwhile, when $\gamma$ is less than 5.9 (Experiments 1 and 2), or greater than 10.4 (Experiment 5), sufficient evaluation results were not obtained in terms of image density, color bleed and feathering.

Also, when the case using the ink set [15] comprising the treating composition f containing a colorant which does not aggregate as a simple substance and the recording composition J (Experiment 6) was compared with the case using the ink set [6] having the same pH as the ink set [15] and comprising the treating composition f containing a colorant which aggregate as a simple substance and the recording composition A, it was noted that the ink set [6] using the recording composition containing a colorant with an initial aggregation point produces a record with higher image quality.

Example 4 (Experiments 7 to 12)

The treating composition f and the recording composition A prepared according the prescription of Example 2 were used to prepare an ink set. Each liquid was filled (charged) in a cartridge and loaded on IpsioJet300: (Ricoh Co., Ltd.) printer. As shown in Table 3, a printing was performed at a constant amount of the adsorbed amount (Mj2) of the recording composition while varying (shaking) the adsorbed

TABLE 2

| Experiment | Treating composition | Recording composition | Ink Set | $\gamma$ (pH) | Mj1 | Mj2 | Mj1/Mj2 | Mj1 + Mj2 | Image Density | Color Bleed | Feathering | Cockling | Water Resistance |
|---|---|---|---|---|---|---|---|---|---|---|---|---|---|
| Experiment 1 | a | A | [1] | 4.0 | 7.1 | 10.2 | 0.7 | 17.4 | Failure | Failure | Failure | Good | Failure |
| Experiment 2 | d | A | [4] | 5.5 | 7.1 | 10.2 | 0.7 | 17.4 | Failure | Failure | Failure | Good | Failure |
| Experiment 3 | f | A | [6] | 6.7 | 7.1 | 10.2 | 0.7 | 17.4 | Excellent | Excellent | Excellent | Good | Excellent |
| Experiment 4 | f | E | [10] | 9.2 | 7.1 | 10.2 | 0.7 | 17.4 | Good | Good | Good | Good | Good |
| Experiment 5 | f | H | [13] | 12.7 | 7.1 | 10.2 | 0.7 | 17.4 | Good | Failure | Failure | Good | Good |
| Experiment 6 | f | J | [15] | 6.7 | 7.1 | 10.2 | 0.7 | 17.4 | Good | Good | Good | Good | Good |

As can be clearly seen from the evaluation results shown in Table 2, the results support the expectation from the results of Example 2 and the image density is high when the pH value ($\gamma$) of the mixture is in the range of $5.9 < \gamma < 10.4$. The ink set [6] (Experiment 3) having the highest viscosity of the mixture shows high image density and inhibited color bleed and feathering.

amount (Mj1) of the treating composition to form a print, which was then evaluated. The printed matter was evaluated for image density, color bleed, feathering, cockling and water resistance. The evaluation process and evaluation criteria were the same as in Example 3. The results are shown in Table 3.

TABLE 3

| Experiment | Treating composition | Recording composition | Ink Set | $\gamma$ (pH) | Mj1 | Mj2 | Mj1/Mj2 | Mj1 + Mj2 | Image Density | Color Bleed | Feathering | Cockling | Water Resistance |
|---|---|---|---|---|---|---|---|---|---|---|---|---|---|
| Experiment 7 | f | A | [6] | 6.7 | 0.511 | 10.210 | 0.05 | 10.721 | Failure | Failure | Failure | Excellent | Failure |
| Experiment 8 | f | A | [6] | 6.7 | 1.021 | 10.210 | 0.1 | 11.231 | Good | Good | Good | Excellent | Good |
| Experiment 9 | f | A | [6] | 6.7 | 3.063 | 10.210 | 0.3 | 13.273 | Good | Good | Good | Good | Good |
| Experiment 10 | f | A | [6] | 6.7 | 7.147 | 10.210 | 0.7 | 17.357 | Excellent | Excellent | Excellent | Good | Excellent |
| Experiment 11 | f | A | [6] | 6.7 | 9.189 | 10.210 | 0.9 | 19.399 | Excellent | Good | Good | Good | Good |
| Experiment 12 | f | A | [6] | 6.7 | 10.210 | 10.210 | 1.0 | 20.420 | Excellent | Good | Good | Failure | Good |

As can be clearly seen from the evaluation results shown in Table 3, it was noted that when Mj1/Mj2=α, high image quality was obtained in 0.1≦α≦0.9. When a is less than 0.1 (Experiment 7) sufficient image density cannot be accomplished. When α is about 1 (Experiment 12), cockling occurs.

Example 5 (Experiments 13 to 19)

The treating composition f and the recording composition A prepared according the prescription of Example 2 were used to prepare an ink set. Each liquid was filled (charged) in a cartridge and loaded on IpsioJet300: (Ricoh Co., Ltd.) printer. As shown in Table 4, a printing was performed at a constant ratio of the adsorbed amount (MJ1) of the treating composition and the adsorbed amount (Mj2) of the recording composition and a constant pH upon mixing to form a print, which was then evaluated for image properties according to the change of the total adsorbed amount. That is, the printed matter was evaluated for image density, color bleed, feathering, cockling and water resistance. The evaluation process and evaluation criteria were the same as in Example 3. The results are shown in Table 4.

TABLE 4

| Experiment | Treating composition | Recording composition | Ink Set | γ (pH) | Mj1 | Mj2 | Mj1/Mj2 | Mj1 + Mj2 | Image Density | Color Bleed | Feathering | Cockling | Water Resistance |
|---|---|---|---|---|---|---|---|---|---|---|---|---|---|
| Experiment 13 | f | A | [6] | 5.73 | 0.314 | 0.449 | 0.7 | 0.76 | Failure | Good | Good | Excellent | Failure |
| Experiment 14 | f | A | [6] | 6.73 | 1.258 | 1.797 | 0.7 | 3.05 | Good | Good | Good | Excellent | Good |
| Experiment 15 | f | A | [6] | 6.73 | 1.787 | 2.553 | 0.7 | 4.34 | Good | Good | Good | Excellent | Good |
| Experiment 16 | f | A | [6] | 6.73 | 5.031 | 7.187 | 0.7 | 12.22 | Good | Good | Good | Good | Good |
| Experiment 17 | f | A | [6] | 6.73 | 7.147 | 10.210 | 0.7 | 17.36 | Excellent | Excellent | Excellent | Good | Excellent |
| Experiment 18 | f | A | [6] | 6.73 | 10.210 | 14.5857 | 0.7 | 24.80 | Excellent | Good | Good | Failure | Good |
| Experiment 19 | f | A | [6] | 6.73 | 15.092 | 21.560 | 0.7 | 36.65 | Excellent | Failure | Failure | Failure | Failure |

As can be clearly see from Table 4, when the amount of the treating composition adsorbed on the paper (Mj1) satisfies 0.314<Mj1<15.092, properties such as image density, color bleed and feathering were good and high image properties were obtained. Among them, in the range of 0.314<Mj1<10.210, excellent image properties including cockling was obtained.

What is claimed is:

1. A process for forming an image, comprising:
applying a recording composition comprising a colorant and a treating composition comprising a component reactive with the colorant as droplets so that the compositions contact and mix with each other on a recording medium; and
adjusting the pH of the mixture so that the treating composition and the recording composition react to form aggregates while any unreacted component that would react with the colorant forms aggregates as a simple substance,
wherein the component that reacts with the colorant has an isoelectric point at which the zeta potential (ζ) is 0 when the zeta potential (ζ) change of the component is plotted relative to corresponding changes in the pH of the mixture, and the recording composition and treating composition are respectively adjusted to satisfy a<γ and a<c, wherein "c" is a pH value of the isoelectric point, "a" is a pH value of the mixture where the zeta potential (ζ) change according to pH is on the more acidic side than the pH (c) of the isoelectric point, and is about −2.5 mV·l/mol, and "γ" is the pH of the mixture.

2. The process according to claim 1, wherein, when the component reactive with the colorant has a pH where the component that reacts with the colorant is eluted, the recording composition and treating composition are respectively adjusted to satisfy the expression: a<γ<e, wherein "e" is a pH where the component that reacts with the colorant is eluted.

3. The process according to claim 2, wherein the recording composition and treating composition are respectively adjusted to satisfy the expression: c−2<γ<c+2.

4. The process according to claim 3, wherein the recording composition and treating composition are respectively adjusted to satisfy the expression: c−1.5<γ<c+1.5.

5. The process according to claim 2, wherein the component that reacts with the colorant comprises cationic fine colloidal silica particles, and the recording composition and treating composition are respectively adjusted to satisfy the expression: ζ<60mV.

6. The process according to claim 2, wherein the colorant has a pH range where the colorant alone aggregates and an initial aggregation point in the boundary of the pH range, and the pH of the mixture is adjusted to satisfy the pH conditions in the range including the initial aggregation point of the colorant, at least where the colorant alone aggregates, to form an image.

7. The process for forming an image according to claim 2, wherein the pH of the mixture, "γ," satisfies the expression: 5.5<γ<10.5.

8. The process for forming an image according to claim 7, wherein the pH of the mixture, "γ," satisfies the expression: 6<γ<10.

9. The process for forming an image according to claim 8, wherein the pH of the mixture, "γ," satisfies the expression: 6.5<γ<9.5.

10. The process for forming an image according to claim 2, wherein the ratio (Mj1/Mj2: α) of an attached amount (Mj1) of the treating composition to an attached amount (Mj2) of the recording composition on the recording medium ranges from 0.1≦a≦0.9.

11. The process for forming an image according to claim 2, wherein the sum (Mj1+Mj2: β) of an attached amount (Mj1) of the treating composition and an attached amount (Mj2) of the recording composition on the recording medium ranges from $0.78<β<20$ (g/m$^2$).

12. The process for forming an image according to claim 2, wherein an average particle diameter (f) of the component that reacts with the colorant in the treating composition and the average particle diameter (g) of the component that reacts with the colorant as a simple-substance aggregate at the pH (γ) of the mixture satisfy the expression: $g/f≦2$.

13. The process for forming an image according to claim 2, wherein the mixture is a buffer solution.

14. The process for forming an image according to claim 13, wherein the buffer solution comprises an "A" component and a "B" component which are separately present in the treating composition and the recording composition, wherein the "A" component and the "B" component show a buffering effect only when they are mixed and reacted in the same liquid.

15. The process for forming an image according to claim 14, wherein the "A" component is cationic or non-ionic.

16. The process for forming an image according to claim 14, wherein the "A" component is a weak acid.

17. The process for forming an image according to claim 14, wherein the "A" component is a salt of a weak base.

18. The process for forming an image according to claim 14, wherein the "B" component is anionic or non-ionic.

19. The process for forming an image according to claim 14, wherein the "B" component is a weak base.

20. The process for forming an image according to claim 14, wherein the "B" component is a salt of a weak acid.

21. The process for forming an image according to claim 2, wherein the component that reacts with a colorant is comprised of fine particles.

22. The process for forming an image according to claim 21, wherein the fine particles comprise a metal oxide.

23. The process for forming an image according to claim 2, wherein the colorant is a pigment.

24. The process for forming an image according to claim 2, wherein the colorant is a dye.

25. The process according to claim 1, wherein the recording composition and treating composition are respectively adjusted to satisfy the expression: $c-2<γ<c+2$.

26. The process according to claim 1, wherein the component that reacts with the colorant comprises cationic fine colloidal silica particles, and the recording composition and treating composition are respectively adjusted to satisfy the expression: $ζ<60$ mV.

27. The process according to claim 1, wherein the colorant has a pH range where the colorant alone aggregates and has an initial aggregation point in the boundary of the pH range, and the pH of the mixture is adjusted to satisfy the pH conditions in the range including the initial aggregation point of the colorant, at least where the colorant alone aggregates, to form an image.

28. The process for forming an image according to claim 1, wherein the pH of the mixture, "γ," satisfies the expression: $5.5<γ<10.5$.

29. The process for forming an image according to claim 1, wherein the ratio (Mj1/Mj2: α) of an attached amount (Mj1) of the treating composition to an attached amount (Mj2) of the recording composition on the recording medium ranges from $0.1≦a≦0.9$.

30. The process for forming an image according to claim 1, wherein the sum (Mj1+Mj2: β) of an attached amount (Mj1) of the treating composition and an attached amount (Mj2) of the recording composition on the recording medium is ranges from $0.78<β<20$ (g/m$^2$).

31. The process for forming an image according to claim 1, wherein an average particle diameter (f) of the component that reacts with the colorant in the treating composition and an average particle diameter (g) of the component that reacts with the colorant as a simple-substance aggregate at the pH (γ) of the mixture satisfy the expression: $g/f>2$.

32. The process for forming an image according to claim 1, wherein the mixture is a buffer solution.

33. The process for forming an image according to claim 32, wherein the buffer solution comprises an "A" component and a "B" component which are separately present in the treating composition and the recording composition, wherein the "A" component and the "B" component show a buffering effect only when they are mixed and reacted in the same liquid.

34. The process for forming an image according to claim 1, wherein the component that reacts with a colorant is comprised of fine particles.

35. An image forming apparatus, comprising:
a container housing at least one of a recording composition comprising a colorant and a treating composition comprising a component that reacts with the colorant;
composition applying means for applying the recording composition and the treating composition as droplets so that the compositions contact and mix with each other on a recording medium; and
a pH adjusting means for adjusting pH of the mixture so that the treating composition and the recording composition react to form aggregates while any unreacted component that would react with the colorant aggregates as a simple substance,
wherein the component reactive with the colorant has an isoelectric point at which the zeta potential (ζ) is 0 when the zeta potential (ζ) change of the component is plotted according to the pH change of the mixture, and
the recording composition and treating composition are respectively adjusted to satisfy the expressions: $a<γ$ and $a<c$, wherein "c" is a pH value of the isoelectric point, "a" is a pH value where the zeta potential (ζ) changes according to pH and is on the more acidic side than the pH (c) of the isoelectric point, and is about −2.5 mV·l/mol, and "γ" is the pH of the mixture.

36. The image forming apparatus according to claim 35, wherein the composition applying means applies the recording composition and the treating composition, so that the ratio (Mj1/Mj2: α) of an attached amount (Mj1) of the treating composition to an attached amount (Mj2) of the recording composition on the recording medium ranges from $0.1≦a≦0.9$.

37. The image forming apparatus according to claim 35, wherein the composition applying means applies the recording composition and the treating composition, so that the sum (Mj1+Mj2: β) of an attached amount (Mj1) of the treating composition and an attached amount (Mj2) of the recording composition on the recording medium ranges from $0.78<β<20$ (g/m$^2$).

38. An ink set, comprising:
a recording composition comprising a colorant; and
a treating composition comprising a component that reacts with the colorant,
wherein the component that reacts with the colorant has an isoelectric point at which the zeta potential (ζ) is 0 when the zeta potential (ζ) change of the component is plotted relative to corresponding changes in the pH of the mixture, and the recording composition and treating composition are respectively adjusted to satisfy the expressions: a<γ and a<c, wherein "c" is a pH value of the isoelectric point, "a" is a pH value where the zeta potential (ζ) changes according to pH and is on the more acidic side than the pH (c) of the isoelectric point, and is about −2.5 mV·l/mol, and "γ" is the pH of the mixture, so that when the recording composition and the treating composition are applied as droplets so that the compositions contact and mix with each other on a recording medium, the pH of the mixture is adjusted to form an image on the recording medium.

39. A cartridge, comprising:

a receiving part comprising a recording composition comprising a colorant and a treating composition comprising a component that reacts with the colorant separately from each other; and an ejecting means for ejecting the treating composition and recording composition separately from each other, wherein the component that reacts with the colorant has an isoelectric point at which the zeta potential (ζ) is 0 when the zeta potential (ζ) change of the component is plotted relative to corresponding changes in the pH of the mixture, and the recording composition and treating composition are respectively adjusted to satisfy the expressions: a<γ and a<c, wherein "c" is a pH value of the isoelectric point, "a" is a pH value where the zeta potential (ζ) changes according to pH is on the more acidic side than the pH (c) of the isoelectric point, and is about −2.5 mV·l/mol, and "γ" is the pH of the mixture.

40. A print, printed on a recording medium by a process for forming an image according to claim 1.

* * * * *